US010612820B2

(12) United States Patent
Takizawa

(10) Patent No.: US 10,612,820 B2
(45) Date of Patent: Apr. 7, 2020

(54) TRANSPORT REFRIGERATION SYSTEM

(71) Applicant: DENSO CORPORATION, Kariya, Aichi-pref. (JP)

(72) Inventor: Ryo Takizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 88 days.

(21) Appl. No.: 16/068,182

(22) PCT Filed: Dec. 6, 2016

(86) PCT No.: PCT/JP2016/086240
§ 371 (c)(1),
(2) Date: Jul. 5, 2018

(87) PCT Pub. No.: WO2017/119225
PCT Pub. Date: Jul. 13, 2017

(65) Prior Publication Data
US 2019/0011154 A1 Jan. 10, 2019

(30) Foreign Application Priority Data

Jan. 8, 2016 (JP) ................................ 2016-002503
Nov. 21, 2016 (JP) ................................ 2016-225782

(51) Int. Cl.
*F25B 13/00* (2006.01)
*B60H 1/32* (2006.01)
(Continued)

(52) U.S. Cl.
CPC ......... *F25B 13/00* (2013.01); *B60H 1/00907* (2013.01); *B60H 1/323* (2013.01);
(Continued)

(58) Field of Classification Search
CPC .... F25B 13/00; F25B 1/10; F25B 2313/0232; F25B 2313/0233; F25B 2313/02742;
(Continued)

(56) References Cited

U.S. PATENT DOCUMENTS

2009/0056358 A1* 3/2009 Kotani .................. F24F 5/0017
62/259.1
2010/0024450 A1* 2/2010 Waldschmidt ......... B60H 1/323
62/115
(Continued)

FOREIGN PATENT DOCUMENTS

JP       2000304397 A  * 11/2000
JP       2010121801 A  *  6/2010
JP          5535510 B2     7/2014

*Primary Examiner* — Frantz F Jules
*Assistant Examiner* — Lionel Nouketcha
(74) *Attorney, Agent, or Firm* — Harness, Dickey & Pierce, P.L.C.

(57) ABSTRACT

A transport refrigeration system is configured to set a first path, a second path, a third path, and fourth path selectively. The first path connects compressors in series. In the first path, interior heat exchangers each serve as an evaporator. The second path connects the compressors in series. In the second path, the interior heat exchangers each serve as a condenser. The third path connects the compressors in parallel. In the third path, at least one of the interior heat exchangers serve as the evaporator and the rest of the interior heat exchangers serve as the condenser. The fourth path connects the compressors in parallel. In the fourth path, the interior heat exchangers each serve as the condenser.

9 Claims, 10 Drawing Sheets

(51) Int. Cl.
*F25B 1/10* (2006.01)
*B60H 1/00* (2006.01)
(52) U.S. Cl.
CPC ......... *B60H 1/3213* (2013.01); *B60H 1/3232*
(2013.01); *F25B 1/10* (2013.01); *B60H 2001/00942* (2013.01); *B60H 2001/00961* (2019.05); *F25B 2313/007* (2013.01); *F25B 2313/009* (2013.01); *F25B 2313/0232* (2013.01); *F25B 2313/0233* (2013.01); *F25B 2313/0234* (2013.01); *F25B 2313/02331* (2013.01); *F25B 2313/02742* (2013.01); *F25B 2313/0314* (2013.01); *F25B 2400/075* (2013.01)

(58) Field of Classification Search
CPC .. B60H 1/3232; B60H 1/00907; B60H 1/323; B60H 2001/00942
See application file for complete search history.

(56) References Cited

U.S. PATENT DOCUMENTS

2014/0123689 A1\* 5/2014 Ellis ................. F25B 13/00
62/79
2014/0245764 A1\* 9/2014 Kibo ................. F25B 49/02
62/126

\* cited by examiner

FIG. 6

| | FIRST CHAMBER | SECOND CHAMBER | EFFICIENCY | PERFORMANCE |
|---|---|---|---|---|
| FIRST STATE | ABSORB HEAT | ABSORB HEAT | HIGH | MIDDLE |
| SECOND STATE | DISSIPATE HEAT | DISSIPATE HEAT | HIGH | MIDDLE |
| THIRD STATE | ABSORB HE | DISSIPATE HEAT | MIDDLE | MIDDLE |
| FOURTH STATE | DISSIPATE HEAT | DISSIPATE HEAT | MIDDLE | HIGH |

TRANSPORT REFRIGERATION SYSTEM

CROSS REFERENCE TO RELATED APPLICATIONS

This application is a U.S. National Phase Application under 35 U.S.C. 371 of International Application No. PCT/JP2016/086240 filed on Dec. 6, 2016 and published in Japanese as WO 2017/119225 A1 on Jul. 13, 2017. This application is based on and claims the benefit of priority from Japanese Patent Application No. 2016-002503 filed on Jan. 8, 2016 and Japanese Patent Application No. 2016-225782 filed on Nov. 21, 2016. The entire disclosures of all of the above applications are incorporated herein by reference.

TECHNICAL FIELD

The present disclosure relates to a transport refrigeration system mounted to a vehicle including a container.

BACKGROUND ART

Transport refrigeration systems are known to be mounted to vehicles including containers. The transport refrigeration systems perform air conditioning for the containers. In Patent Literature 1 discloses such a transport refrigeration system that includes a plurality of interior heat exchangers configured to perform a heat exchange between air and a heat medium. When the container of the vehicle is divided into more than one refrigeration compartments (i.e., chambers), the refrigeration compartments each include one interior heat exchanger such that air conditionings are performed for the refrigeration compartments independently.

In the transport refrigeration system of Patent Literature 1, paths, which allow refrigerant to flow therethrough, are switched by opening and closing a plurality of valves. Accordingly, the valves are configured to switch between a state where the interior heat exchangers serve as evaporators of a refrigeration cycle and a state where the interior heat exchangers serve as condensers of the refrigeration cycle.

PRIOR ART LITERATURES

Patent Literature

Patent Literature 1: JP 5535510 B

SUMMARY OF INVENTION

When performing air conditioning for a container, a performance required for the transport refrigeration system to exert varies depending on situations. For example, heat absorbing performance of the refrigeration cycle may be set to be high in a case where a temperature in the container is required to be low when the ambient temperature is high. On the other hand, the heat absorbing performance of the refrigeration cycle may be set to be low in a case where the temperature in the container is required to be low when the ambient temperature is not high. In a configuration that the performance required for the transport refrigeration system is not adjusted, the transport refrigeration system is switched between being operated and being stopped frequently. This situation may not be preferable.

As methods to adjust the performance of the transport refrigeration system, for example, it may be considered to change a rotational speed of a compressor, which configures the refrigeration cycle, depending on situations. However, adjusting the performance by changing the rotational speed of the compressor may be difficult when a power source, which is dedicated for the compressor and drives the compressor, is not mounted and the compressor is driven by power generated by an internal combustion engine (for traveling the vehicle) mounted to the vehicle. Then, it may be considered to change the rotational speed of the compressor by an electric compressor that uses an inverter supplying power to the electric compressor. However, according to the above-described configuration, system may be complicated for the power source dedicated for the compressor or for the inverter.

In Patent Literature 1, although functions of the interior heat exchangers can be changed, adjusting the performance of the transport refrigeration system is not considered.

The present disclosure addresses the above-described issues. Thus, it is an objective of the present disclosure to provide a transport refrigeration system that is configured to perform air conditionings for a plurality of compartments independently and that is configured to adjust a performance of the transport refrigeration system easily and appropriately without adjusting a rotational speed of a compressor.

In an aspect of the present disclosure, a transport refrigeration system is mounted to a vehicle including a container divided into a plurality of chambers. The transport refrigeration system includes interior heat exchangers, an exterior heat exchanger, compressors, and switching valves. The interior heat exchangers are positioned in the chambers respectively and are configured to perform heat exchanges between a refrigerant and air in the chambers. The exterior heat exchanger is configured to perform a heat exchange between the refrigerant and an outside air. The compressors are configured to discharge the refrigerant and are configured to allow the refrigerant to circulate between the interior heat exchangers and the exterior heat exchanger. The switching valves are configured to set paths selectively. The paths allow the refrigerant, which is discharged from the compressors, to flow therethrough. The paths include a first path, a second path, a third path, and a fourth path. The first path connects the compressors in series. In the first path, the interior heat exchangers each serve as an evaporator.

The second path connects the compressors in series. In the second path, the interior heat exchangers each serve as a condenser. The third path connects the compressors in parallel. In the third path, at least one of the interior heat exchangers serve as the evaporator and the rest of the interior heat exchangers serve as the condenser. The fourth path connects the compressors in parallel. In the fourth path, the interior heat exchangers each serve as the condenser.

As described above, the transport refrigeration system switches to the first, second, third and fourth paths selectively. By selecting one of the first, second, third and fourth paths, a functions and performances of the interior heat exchangers can be changed easily.

For example, in order to operate the interior heat exchangers all as condensers, the first path, which makes heat dissipating performance low, or the fourth path, which makes the heat dissipating performance high, may be selected depending on a required level of the heat dissipating performance. The functions and the performances of the interior heat exchangers can be changed only by switching the paths, i.e., the rotational speeds of the compressors are not adjusted necessarily.

Thus, according to the present disclosure, a transport refrigeration system that is configured to perform air conditionings for a plurality of compartments independently and that is configured to adjust a performance of the transport refrigeration system easily and appropriately without adjusting a rotational speed of a compressor can be provided.

BRIEF DESCRIPTION OF DRAWINGS

FIG. 6 is a diagram showing efficiency and performance of a compressor in some states.

DESCRIPTION OF EMBODIMENTS

Figure 1:
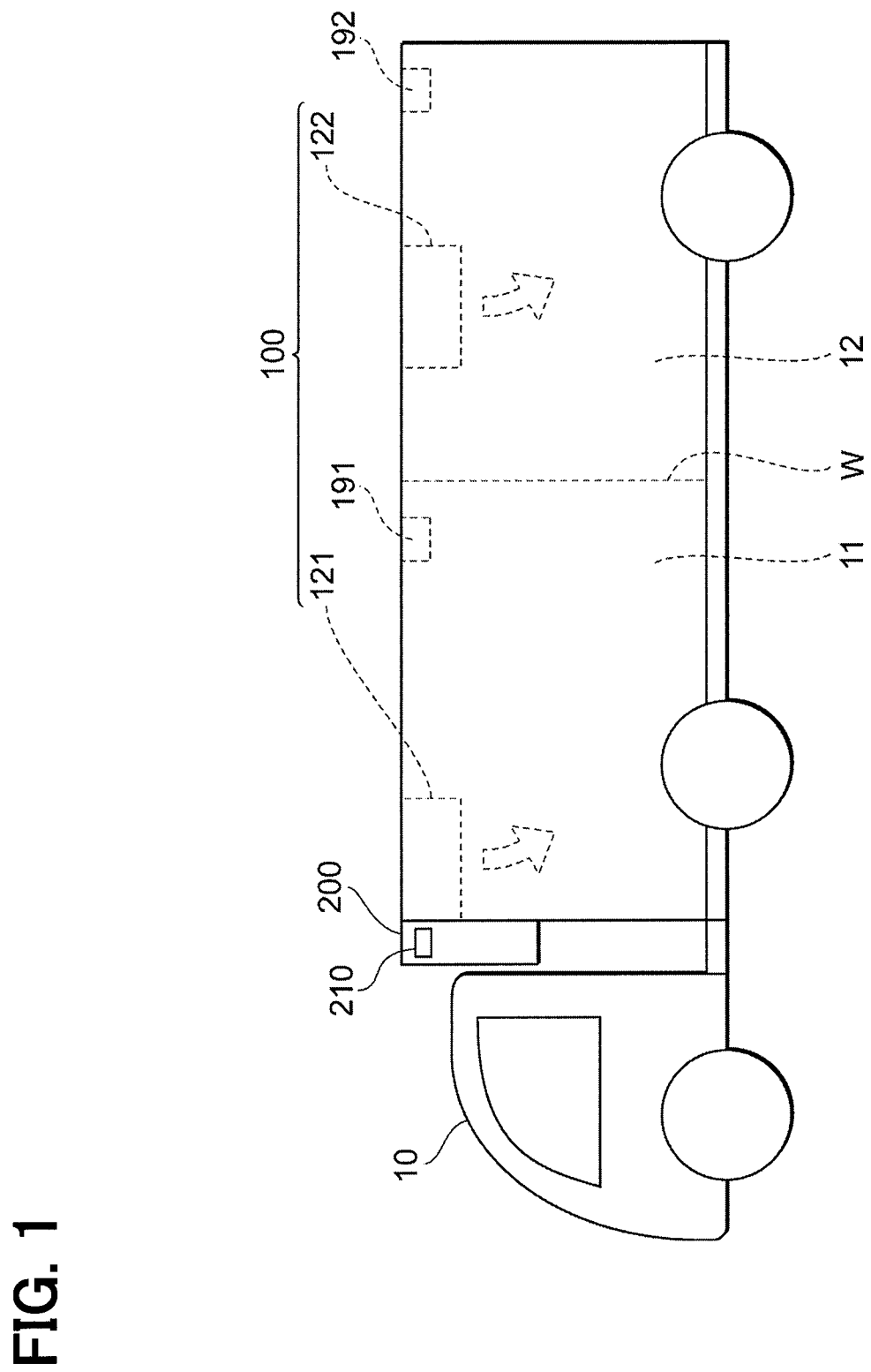
FIG. 1 is a diagram illustrating a vehicle mounting a transport refrigeration system in an embodiment.

An embodiment of the present disclosure will be described hereinafter referring to drawings. The same component is assigned with the same reference number in the drawings, and a redundant explanation will be omitted, such that the following description can be understood easily.

A transport refrigeration system 100 in the present embodiment is mounted to a vehicle such as a transportation vehicle 10 including a container and performs air conditioning of the container. As shown in FIG. 1, the container of the transportation vehicle 10 is divided into two chambers. One of the two chambers will be referred to as a first chamber 11 and the other of the two chambers will be referred to as a second chamber 12. The first chamber 11 is located in front of the second chamber 12. The first chamber 11 and the second chamber 12 are divided from each other by a partition wall W. The partition wall W blocks transfer of air and heat between the first chamber 11 and the second chamber 12.

For example, the container (e.g., the first chamber 11) may house fresh produce. The transportation vehicle 10 is configured to travel while keeping a temperature in the container to a set temperature. The set temperature is set appropriately depending on cargos housed in the container. Different set temperatures may be set for the first chamber 11 and the second chamber 12 respectively.

A heat exchanger, which is configured to perform a heat exchange between the refrigerant and air so as to adjust a temperature of the air, is located in each of the first chamber 11 and the second chamber 12. For example, a first interior heat exchanger 121 is located in the first chamber 11 and a second interior heat exchanger 122 is located in the second chamber 12. The first interior heat exchanger 121 and the second interior heat exchanger 122 are included in the transport refrigeration system 100 and correspond to "interior heat exchangers" of the present embodiment. In FIG. 1, a portion of the transport refrigeration system 100, other than the first interior heat exchanger 121 and the second interior heat exchanger 122, is schematically illustrated and assigned with reference number 200. The portion may include a device such as a first compressor 111 described later. The portion will be referred to as a mechanical section 200 hereinafter. The first interior heat exchanger 121 and the mechanical section 200 may be assembled integrally to form one component housed in a single housing.

The mechanical section 200 includes a controller 210 that controls the transport refrigeration system 100 as a whole. The controller 210 is configured as a well-known computer system including CPU, ROM, and RAM. The controller 210 may be configured as a dedicated device for controlling the operation of the transport refrigeration system 100 or as a part of another device (for example, an ECU mounted to the transportation vehicle 10). The control performed by the controller 210 will be described later.

A temperature detector 191 is positioned in the first chamber 11. The temperature detector 191 is configured to detect a temperature in the first chamber 11. The temperature detected by the temperature detector 191 is sent to the controller 210. The temperature detector 191 may be positioned inside a duct that allows air to flow therethrough from the first chamber 11 to the transport refrigeration system 100.

A temperature detector 192 is positioned in the second chamber 12. The temperature detector 192 is configured to detect a temperature in the second chamber 12. The temperature detected by the temperature detector 192 is sent to the controller 210. The temperature detector 192 may be positioned inside a duct that allows air to flow therethrough from the second chamber 12 to the transport refrigeration system 100.

The overall configuration of the transport refrigeration system 100 will be described hereafter referring to FIG. 2. The transport refrigeration system 100 may be a refrigeration cycle that is configured to allow the refrigerant to flow therethrough while transporting heat. The transport refrigeration system 100 includes the first compressor 111, a second compressor 112, an exterior heat exchanger 120, the first interior heat exchanger 121, and the second interior heat exchanger 122. Illustrations of the temperature detectors 191 and 192 and the controller 210 are omitted in FIG. 2 to FIG. 5.

The first compressor 111 and the second compressor 112 may be referred to as a pair of compressors and are configured to discharge the refrigerant to circulate in the transport refrigeration system 100.

The first compressor 111 is connected with an actuator (not shown). When the actuator starts operating the first compressor 111, the refrigerant flows into the first compressor 111 from an inlet 111b and flows out of the first compressor 111 from an outlet 111a. For example, the actuator may be dedicated to the first compressor 111 in the present embodiment. The first compressor 111 may be operated by power generated by an internal combustion engine of the transportation vehicle 10.

The outlet 111a of the first compressor 111 is connected to one end of a pipe P01 that allows the refrigerant to flow therethrough. The other end of the pipe P01 is connected to a four-way valve 101. The four-way valve 101 is configured to switch various paths, which allow the refrigerant to circulate therein, and starts operating when receiving a control signal from the controller 210. The switching performed by the four-way valve 101 will be described later.

The four-way valve 101 and a four-way valve 102 described later correspond to "switching valves" of the present embodiment.

The inlet 111b of the first compressor 111 is connected to one end of a pipe P09 that allows the refrigerant to flow therethrough. The other end of the pipe P09 is connected to the four-way valve 102. The four-way valve 102 is configured to switch various paths, which allow the refrigerant to circulate therein, and starts operating when receiving a control signal from the controller 210. The switching performed by the four-way valve 102 will be described later.

The second compressor 112 has the same configuration as the first compressor 111. The second compressor 112 is connected with an actuator (not shown). When the actuator starts operating the second compressor 112, the refrigerant flows into the second compressor 112 from an inlet 112b and flows out of the second compressor 112 from an outlet 112a. For example, the actuator may be dedicated to the second compressor 112 in the present embodiment. The second compressor 112 may be operated by power generated by an internal combustion engine of the transportation vehicle 10.

The outlet 112a of the second compressor 112 is connected to one end of a pipe P08 that allows the refrigerant to flow therethrough. The other end of the pipe P08 is connected to the four-way valve 102. That is, the four-way valve 102 is mounted to a passage connecting the outlet 112a of the second compressor 112 and the inlet 111b of the first compressor 111 to each other. More specifically, the four-way valve 102 is positioned between the pipe 08 and the pipe 09.

The inlet 112b of the second compressor 112 is connected to one end of a pipe P07 that allows the refrigerant to flow therethrough. The other end of the pipe P07 is connected to the four-way valve 101. One end of a pipe P10 is connected to the pipe P07. The other end of the pipe P10 is connected to the four-way valve 102. In FIG. 2, a point where the pipe P07 and the pipe P10 are connected to each other is shown as a junction J4.

The exterior heat exchanger 120 is a heat exchanger that is configured to perform a heat exchange between the refrigerant passing therethrough and outside air. For example, the outside air may be air outside the transportation vehicle 10. As described later, the exterior heat exchanger 120 serves as a condenser that is configured to condense a gas refrigerant by performing a heat exchange between the gas refrigerant and air, and also serves as an evaporator that is configured to evaporate a liquid refrigerant by performing a heat exchange between the liquid refrigerant and air. A blower 130 is mounted near the exterior heat exchanger 120 to supply the outside air to the exterior heat exchanger 120. The exterior heat exchanger 120 corresponds to "exterior heat exchanger" of the present embodiment.

The exterior heat exchanger 120 is mounted to a pipe P02. One end of the pipe P02 is connected to the four-way valve 101. The other end of the pipe P02 is connected to a liquid reservoir 180. The liquid reservoir 180 stores a part of the refrigerant, circulating through the transport refrigeration system 100, in a liquid state.

A balance between the gas refrigerant and the liquid refrigerant in the refrigerant circulating through the transport refrigeration system 100 varies due to load. For example, a ratio of the liquid refrigerant rises and a part thereof may become surplus depending on the load. The liquid reservoir 180 stores the excess liquid refrigerant such that a volume of the refrigerant circulating through the transport refrigeration system 100 is maintained appropriately.

The other end 181 of the pipe P02 is positioned inside the liquid reservoir 180 below a liquid level LS of the liquid refrigerant stored in the liquid reservoir 180. As a result, the liquid reservoir 180 is configured to discharge only the liquid refrigerant (not the gas refrigerant) when the refrigerant flows from the liquid reservoir 180 to the exterior heat exchanger 120.

A throttle mechanism 140 is mounted to the pipe P02 between the exterior heat exchanger 120 and the liquid reservoir 180. The throttle mechanism 140 defines a passage therein through which the refrigerant flows and is configured to reduce a cross-sectional area of the passage. In other words, the throttle mechanism 140 is configured to reduce a flow rate of the refrigerant flowing therethrough. Thus, the throttle mechanism 140 serves as an expansion valve. In the present embodiment, the throttle mechanism 140 is an electric expansion valve. The throttle mechanism 140 is configured to adjust the opening degree of the passage based on a refrigerant temperature downstream of the throttle mechanism 140. The throttle mechanism 140 corresponds to "exterior throttle mechanism" of the present embodiment.

A pipe 150 is connected to the pipe P02 and serves as a bypass passage that allows the refrigerant to flow therethrough while bypassing the throttle mechanism 140. A switching valve 160 is mounted to the pipe 150. The switching valve 160 is configured to open and close the pipe 150. The switching valve 160 is configured to be switched between being open and being closed when depending on control signals from the controller 210. When the switching valve 160 is open, the refrigerant flowing through the pip P02 flows through the pipe 150. In this situation, a pressure of the refrigerant upstream of the throttle mechanism 140 is almost the same as a pressure of the refrigerant downstream of the throttle mechanism 140. On the other hand, when the switching valve 160 is closed, all of the refrigerant flowing through the pipe P02 flows through the throttle mechanism 140. In this situation, a pressure of the refrigerant falls while passing through the throttle mechanism 140. The pipe 150 corresponds to "exterior bypass passage" of the present embodiment. The switching valve 160 corresponds to "exterior switching valve" of the present embodiment.

As described above, the first interior heat exchanger 121 is a heat exchanger positioned in the first chamber 11. The first interior heat exchanger 121 is configured to heat or cool air by performing a heat exchange between the refrigerant flowing through the first interior heat exchanger 121 and the air in the first chamber 11. As described later, the first interior heat exchanger 121 serves as a condenser that is configured to condense a gas refrigerant by performing a heat exchange between the gas refrigerant and air, and also serves as an evaporator that is configured to evaporate a liquid refrigerant by performing a heat exchange between the liquid refrigerant and air. A blower 131 is mounted near the first interior heat exchanger 121 to supply the air to the first interior heat exchanger 121.

The first interior heat exchanger 121 is mounted to a pipe P04. One end of the pipe P04 is connected to the pipe P03 extending from the liquid reservoir 180. In FIG. 2, a point where the pipe P03 and the pipe P04 are connected to each other is shown as a junction J1.

The other end 182 of the pipe P03 proximate to the liquid reservoir 180 is positioned inside the liquid reservoir 180 below the liquid level LS of the liquid refrigerant stored in the liquid reservoir 180. As a result, the liquid reservoir 180 is configured to discharge only the liquid refrigerant (not the gas refrigerant) when the refrigerant flows from the liquid reservoir 180 to the first interior heat exchanger 121.

A throttle mechanism 141 is mounted to the pipe P04 between the first interior heat exchanger 121 and the junction J1. The throttle mechanism 141 defines a passage therein through which the refrigerant flows and is configured to reduce a cross-sectional area of the passage. In other words, the throttle mechanism 141 is configured to reduce a flow rate of the refrigerant flowing therethrough. Thus, the throttle mechanism 141 serves as an expansion valve. In the present embodiment, the throttle mechanism 141 is an electric expansion valve. The throttle mechanism 141 is configured to adjust the opening degree of the passage based on a refrigerant temperature downstream of the throttle mechanism 141. The throttle mechanism 141 corresponds to "exterior throttle mechanism" of the present embodiment as well.

A pipe 151 is connected to the pipe P04 and serves as a bypass passage that allows the refrigerant to flow therethrough while bypassing the throttle mechanism 141. A switching valve 161 is mounted to the pipe 151. The switching valve 161 is configured to open and close the pipe 151. The switching valve 161 is configured to be switched between being open and being closed when depending on control signals from the controller 210. When the switching valve 161 is open, the refrigerant flowing through the pipe P04 flows through the pipe 151. In this situation, a pressure of the refrigerant upstream of the throttle mechanism 141 is almost the same as a pressure of the refrigerant downstream of the throttle mechanism 141. On the other hand, when the switching valve 161 is closed, all of the refrigerant flowing through the pipe P04 flows through the throttle mechanism 141. In this situation, a pressure of the refrigerant falls while passing through the throttle mechanism 141. The pipe 151 corresponds to "exterior bypass passage" of the present embodiment together with a pipe 152 described later. The switching valve 161 corresponds to "interior switching valve" of the present embodiment together with a switching valve 162 described later.

A switching valve 171 is mounted to the pipe P04. The first interior heat exchanger 121 is positioned between the switching valve 141 and the switching valve 171. The switching valve 171 is configured to be switched between being open and being closed when depending on control signals from the controller 210. The switching valve 171 blocks a flow of the refrigerant flowing through the pipe P04 when being closed.

As described above, the second interior heat exchanger 122 is a heat exchanger positioned in the second chamber 12. The second interior heat exchanger 122 is configured to heat or cool air by performing a heat exchange between the refrigerant flowing through the second interior heat exchanger 122 and the air in the second chamber 12. The second interior heat exchanger 122 serves as a condenser that is configured to condense a gas refrigerant by performing a heat exchange between the gas refrigerant and air, and also serves as an evaporator that is configured to evaporate a liquid refrigerant by performing a heat exchange between the liquid refrigerant and air. A blower 132 is mounted near the second interior heat exchanger 122 to supply the air to the second interior heat exchanger 122.

The second interior heat exchanger 122 is mounted to a pipe P05. One end of the pipe P05 is connected to the junction J1. That is, the one end of the pipe P05 is connected to the pipe P03 extending from the liquid reservoir 180.

The throttle mechanism 142 is mounted to the pipe P05 between junction J1 and the second interior heat exchanger 122. The throttle mechanism 142 defines a passage therein through which the refrigerant flows and is configured to reduce a cross-sectional area of the passage. In other words, the throttle mechanism 142 is configured to reduce a flow rate of the refrigerant flowing therethrough. Thus, the throttle mechanism 142 serves as an expansion valve. In the present embodiment, the throttle mechanism 142 is an electric expansion valve. The throttle mechanism 142 is configured to adjust the opening degree of the passage based on a refrigerant temperature downstream of the throttle mechanism 142.

A pipe 152 is connected to the pipe P05 and serves as a bypass passage that allows the refrigerant to flow therethrough while bypassing the throttle mechanism 142. The switching valve 162 is mounted to the pipe 152. The switching valve 162 is configured to open and close the pipe 152. The switching valve 162 is configured to be switched between being open and being closed when depending on control signals from the controller 210. When the switching valve 162 is open, the refrigerant flowing through the pipe P05 flows through the pipe 152. In this situation, a pressure of the refrigerant upstream of the throttle mechanism 142 is almost the same as a pressure of the refrigerant downstream of the throttle mechanism 142. On the other hand, when the switching valve 162 is closed, all of the refrigerant flowing through the pipe P05 flows through the throttle mechanism 142. In this situation, a pressure of the refrigerant falls while passing through the throttle mechanism 142.

A switching valve 172 is mounted to the pipe P05. The second interior heat exchanger 122 is positioned between the throttle mechanism 142 and the switching valve 172. The switching valve 172 is configured to be switched between being open and being closed when depending on control signals from the controller 210. The switching valve 172 blocks a flow of the refrigerant flowing through the pipe P05 when being closed.

One end of a pipe P11 is connected to the pipe P05 between the second interior heat exchanger 122 and the switching valve 172. The other end of the pipe P11 is connected to the four-way valve 102. In FIG. 2, a point where the pipe P05 and the pipe P11 are connected to each other is shown as a junction J3.

A check valve 103 is mounted to the pipe P11 and is located adjacent to the junction J3. The check valve 103 may be referred to as a switching valve. The check valve 103 is configured to allow the refrigerant to flow from the four-way valve 102 to the junction J3 and is configured to prevent the refrigerant from flowing from the junction J3 to the four-way valve 102.

The other end of the pipe P04 away from the junction J1 is connected with the other end of the pipe P05 away from the junction J1 in the junction J2. The junction J2 and the four-way valve 101 are connected to each other through a pipe P06.

Figure 2:
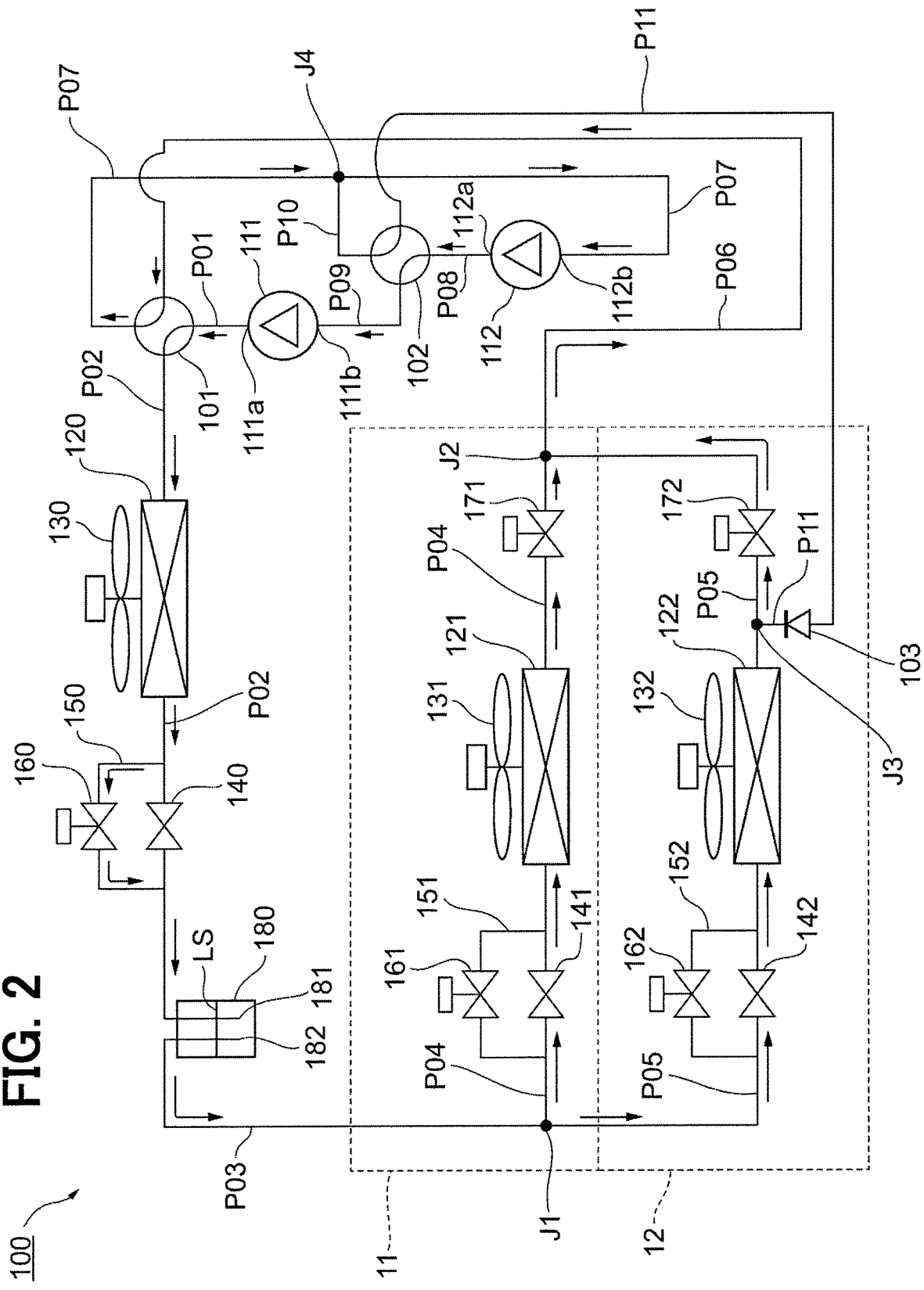
FIG. 2 is a schematic diagram showing the transport refrigeration system as a whole and flows of refrigerant circulating therein in the embodiment.

In FIG. 2, directions along which the refrigerant flows in the transport refrigeration system 100 are shown by arrows. It should be noted that the directions are shown as examples. The transport refrigeration system 100 includes various paths that allows the refrigerant to flow therethrough. The paths can be switched by devices such as the four-way valves 101 and 102.

In a state shown in FIG. 2, the pipe P01 and the pipe P02 are connected to each other through the four-way valve 101, and the pipe P06 and the pipe P07 are connected to each other through the four-way valve 101 as well. The pipe P08 and the pipe P09 are connected to each other through the four-way valve 102, and the pipe P11 and the pipe P10 are connected to each other through the four-way valve 102 as well. Accordingly, the refrigerant flowing out of the second compressor 112 flows to the first compressor 111, flows out of the first compressor 111, and then flows to the exterior heat exchanger 120. Thus, in the state shown in FIG. 2, a first path that connects the first compressor 111 and the second compressor 112 in series is set.

In the state shown in FIG. 2, the switching valves 160, 171, and 172 are open, and the switching valves 161 and 162 are closed.

The refrigerant flowing through the first compressor 111 and the second compressor 112, which are connected to each other in series, flows through the exterior heat exchanger 120, the pipe 150, and the liquid reservoir 180 in this order, and then flows into the junction J1 via the pipe P03. Subsequently, a part of the refrigerant flowing into the junction J1 flows through the throttle mechanism 141. A pressure of the part of the refrigerant falls while the refrigerant flows through the throttle mechanism 141, therefore the part of the refrigerant becomes a low-pressure refrigerant. The low-pressure refrigerant passes through the first interior heat exchanger 121. The rest of the refrigerant flowing into the junction J1 flows through the throttle mechanism 142. A pressure of the rest of the refrigerant falls while the refrigerant flows through the throttle mechanism 142, therefore the rest of the refrigerant becomes a low-pressure refrigerant. The low-pressure refrigerant passes through the second interior heat exchanger 122.

The low-pressure refrigerant after passing through the first interior heat exchanger 121 and the low-pressure refrigerant after passing through the second interior heat exchanger 121 are mixed with each other in the junction J2. Subsequently, the mixed refrigerant flows through the pipe P06, the four-way valve 101, and the pipe P07 in this order, and then returns to the inlet 112b of the second compressor 112.

Here, a pressure of the refrigerant in the junction J3 is higher than a pressure of the refrigerant in the junction J4 when the refrigerant circulates through the first path as described above. Accordingly, the check valve 103 blocks a flow of the refrigerant in the pipe P11. Therefore, all of the refrigerant, which flows from the four-way valve 101 into the pipe P07, is prevented from flowing from the junction J4 into the pipe P10 and is allowed to flow into the second compressor 112.

Since the refrigerant flows through the first path as described above, the exterior heat exchanger 120 serves as a condenser in the first path, i.e., in the state shown in FIG. 2. The first interior heat exchanger 121 and the second interior heat exchanger 122 each serve as an evaporator in the first path, i.e., in the state shown in FIG. 2. As a result, heat, which is transferred from the first chamber 11 and recovered in the first interior heat exchanger 121, and heat, which is transferred from the second chamber 12 and recovered in the second interior heat exchanger 122, are transferred to the exterior heat exchanger 120 by the refrigerant, and then are emitted to the outside air in the exterior heat exchanger 120. That is, the air both in the first chamber 11 and the second chamber 12 are cooled, i.e., a cooling operation is performed.

The state shown in FIG. 2, in which the refrigerant flows through the first path, will be referred to as a first state hereinafter. In the present embodiment, the transport refrigeration system 100 is configured to be operated in the first state and is configured to be operated in at least other three states, i.e., second, third, and fourth states, as well. For example, the four states are set selectively in a manner that the controller 210 operates devices such as the four-way valve 101 based on setup information from a user. That is, the controller 210 is configured to perform a control for setting the first, second, third, and fourth states selectively.

The second state of the transport refrigeration system 10 will be described hereafter referring to FIG. 3. In the second state shown in FIG. 3, the pipe P01 and the pipe P06 are connected to each other through the four-way valve 101, and the pipe P02 and the pipe P07 are connected to each other through the four-way valve 101 as well. The pipe P08 and the pipe P09 are connected to each other through the four-way valve 102, and the pipe P11 and the pipe P10 are connected to each other through the four-way valve 102 as well. Accordingly, the refrigerant flowing out of the second compressor 112 flows to the first compressor 111, flows out of the first compressor 111, and then flows to the junction J2 via the pipe P06. Thus, in the second state, a second path that connects the first compressor 111 and the second compressor 112 in series is set. In the second state, the refrigerant flowing out of the first compressor 111 flows in a different way as compared to the first state.

Figure 3:
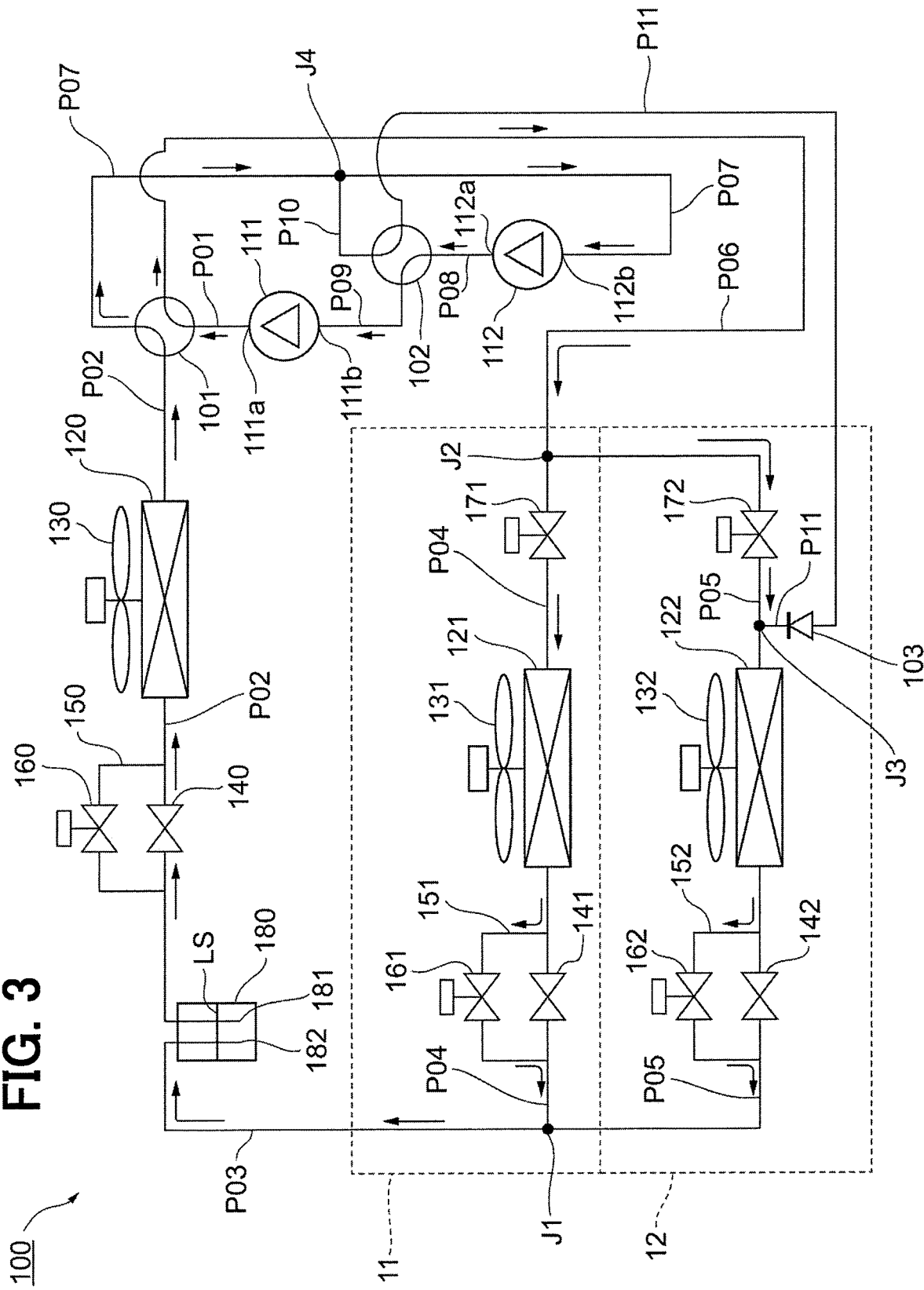
FIG. 3 is a schematic diagram showing the transport refrigeration system as a whole and flows of refrigerant circulating therein in the embodiment.

In the second state shown in FIG. 3, the switching valves 161, 162, 171, 172 are open, and the switching valve 160 is closed.

The refrigerant flowing through the first compressor 111 and the second compressor 112, which are connected to each other in series, flows into the junction J2 via the pipe P06. A part of the refrigerant flowing into the junction J2 flows into the pipe P04, flows through the first interior heat exchanger 121 and the pipe 151 in this order, and then flows into the junction J1. The rest of the refrigerant flowing into the junction J2 flows into the pipe P05, flows through the second interior heat exchanger 122 and the pipe 152 in this order, and then flows into the junction J1. The mixed refrigerant mixed in the junction J1 flows into the throttle mechanism 140 via the liquid reservoir 180. A pressure of the mixed refrigerant falls while the mixed refrigerant flows through the throttle mechanism 140, therefore the mixed refrigerant becomes a low-pressure refrigerant. The low-pressure refrigerant passes through the exterior heat exchanger 120. Subsequently, the low-pressure refrigerant flows through the four-way valve 101 and the pipe P07, and then returns to the inlet 112b of the second compressor 112.

Here, a pressure of the refrigerant in the junction J3 is higher than a pressure of the refrigerant in the junction J4 when the refrigerant circulates through the first path as described above. Accordingly, the check valve 103 blocks a flow of the refrigerant in the pipe P11. That is, the check valve 103 prevents the refrigerant, which flows out of the first compressor 111 and passes through the switching valve 172, from flowing toward the second compressor 112 through the check valve 103. Therefore, all of the refrigerant, which flows from the four-way valve 101 into the pipe P07, is prevented from flowing from the junction J4 into the pipe P10 and is allowed to flow into the second compressor 112.

Since the refrigerant flows through the second path as described above, the exterior heat exchanger 120 serves as an evaporator in the second path, i.e., in the second state shown in FIG. 3. The first interior heat exchanger 121 and the second interior heat exchanger 122 each serve as a condenser in the second path, i.e., in the second state shown in FIG. 3. Accordingly, the exterior heat exchanger 120 recovers heat from the outside air, and a part of the heat transfers to the first interior heat exchanger 121 by the refrigerant and then is dissipated into the first chamber 11. The rest of the heat recovered from the outside air is transferred to the second interior heat exchanger 122 by the refrigerant, and then is dissipated into the second chamber 12. That is, the air both in the first chamber 11 and the second chamber 12 are heated, i.e., a heating operation is performed.

The third state of the transport refrigeration system 10 will be described hereafter referring to FIG. 4. In the third state shown in FIG. 4, the pipe P01 and the pipe P02 are connected to each other through the four-way valve 101, and the pipe P06 and the pipe P07 are connected to each other through the four-way valve 101 as well. The pipe P08 and the pipe P11 are connected to each other through the four-way valve 102, and the pipe P09 and the pipe P10 are connected to each other through the four-way valve 102 as well. Accordingly, a part of the refrigerant in the junction J4 flows into the first compressor 111 through the pipes P10 and P09, flows out of the first compressor 111, and then flows to the exterior heat exchanger 120. The rest of the refrigerant in the junction J4 flows into the second compressor 112 through the pipe P07, flows out of the second compressor 112, and then flows to the check valve 103. Thus, in the third state shown in FIG. 4, a third path that connects the first compressor 111 and the second compressor 112 in parallel is set.

Figure 4:
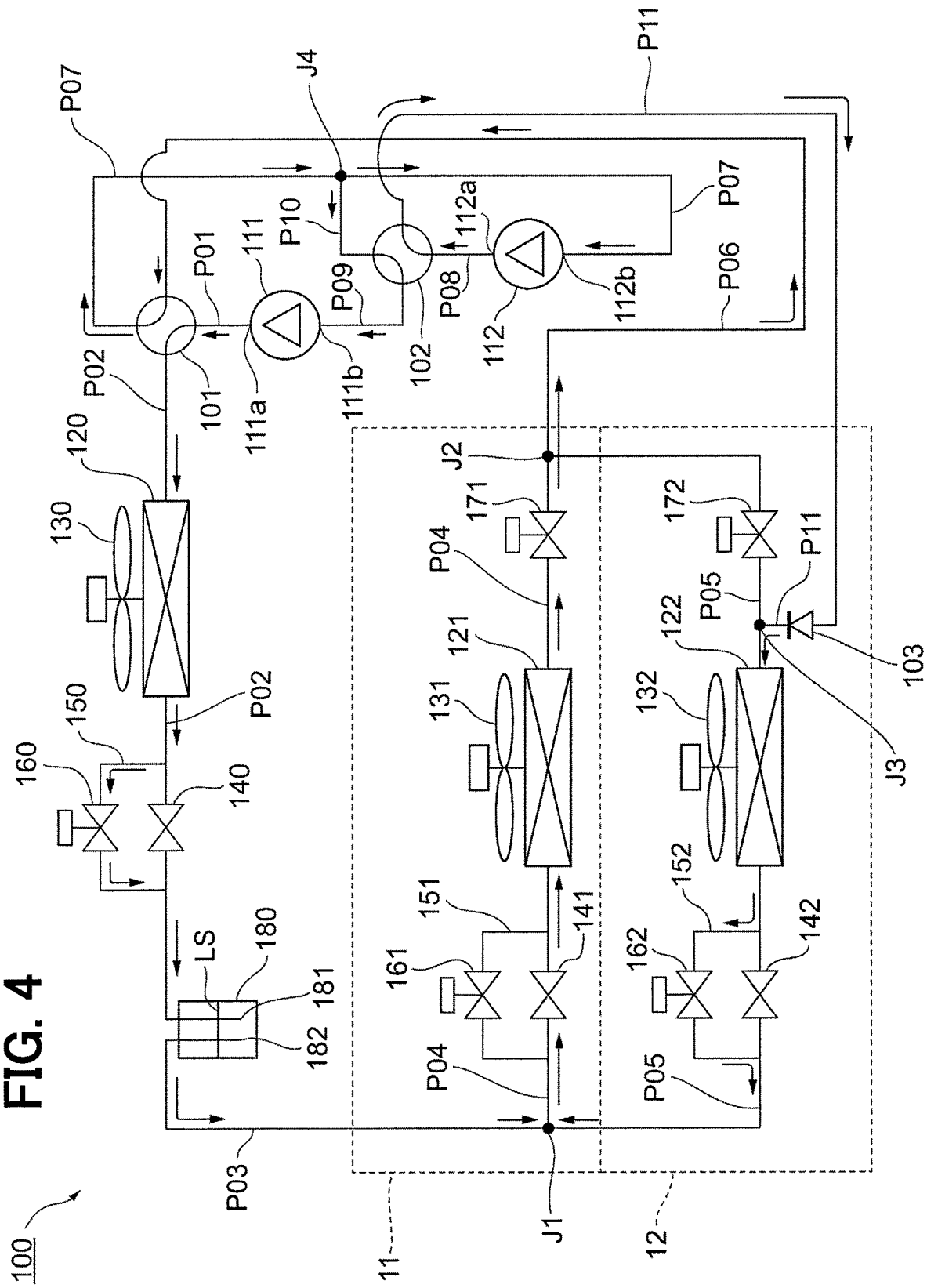
FIG. 4 is a schematic diagram showing the transport refrigeration system as a whole and flows of refrigerant circulating therein in the embodiment.

In the third state shown in FIG. 4, the switching valves 160, 162, and 171 are open, and the switching valves 161 and 172 are closed.

A path that allows the refrigerant, discharged from the first compressor 111, to flow therethrough will be described hereafter. The refrigerant flows into the pipe P02 through the pipe P01 and the four-way valve 101, flows through the exterior heat exchanger 120, the pipe 150, and the liquid reservoir 180 in this order, and then flows into the junction J1 via the pipe P03. Subsequently, the refrigerant flowing into the junction J1 flows through the throttle mechanism 141. A pressure of the refrigerant falls while the refrigerant flows through the throttle mechanism 141, therefore the refrigerant becomes a low-pressure refrigerant. The low-pressure refrigerant passes through the first interior heat exchanger 121. Since the switching valve 172 is closed in the third state, all of the refrigerant after passing through the first interior heat exchanger 121 flows into the pipe P06, flows through the four-way valve 101 and the pipe P07, and then flows into the junction J4. Subsequently, as described above, the part of the refrigerant flowing into the junction J4 flows to the first compressor 111, and the rest of the refrigerant flowing into the junction J4 flows to the second compressor 112.

A path that allows the refrigerant, discharged from the second compressor 112, to flow therethrough will be described hereafter. The refrigerant flows into the pipe P11 through the pipe P08 and the four-way valve 102, and then flows into the pipe P05 through the check valve 103. Since the switching valve 172 is closed in the third state, all of the refrigerant flowing into the pipe P05 passes through the second interior heat exchanger 122. Subsequently, the refrigerant flows into the junction J11 via the pipe 152, and then is mixed with the refrigerant flowing into the junction J1 from the pipe P03. Then, the mixed refrigerant passes through the throttle mechanism 141 and flows into the junction J4 through the above-described path.

Here, a pressure of the refrigerant in the junction J3 is lower than a pressure of the refrigerant in the pipe P08 when the refrigerant circulates through the third path as described above. Accordingly, the check valve 103 does not block a flow of the refrigerant in the pipe P11.

Since the refrigerant flows through the third path as described above, the exterior heat exchanger 120 serves as a condenser in the third path, i.e., in the third state shown in FIG. 4. The first interior heat exchanger 121 and the second interior heat exchanger 122 each serve as a condenser in the third path, i.e., in the third state shown in FIG. 4. Therefore, the first interior heat exchanger 121 recovers heat of air inside the first chamber 11. A part of the heat is transferred to the exterior heat exchanger 120 by the refrigerant, and then is dissipated to the outside air. The rest of the heat is transferred to the second interior heat exchanger 122 by the refrigerant, and then is dissipated into the second chamber 12. That is, the air is cooled, i.e., the cooling operation is performed, in the first chamber 11, and the other hand, the air is heated, i.e., the heating operation is performed, in the second chamber 12.

The fourth state of the transport refrigeration system 10 will be described hereafter referring to FIG. 5. In the fourth state shown in FIG. 5, the pipe P01 and the pipe P06 are connected to each other through the four-way valve 101, and the pipe P02 and the pipe P07 are connected to each other through the four-way valve 101 as well. The pipe P08 and the pipe P11 are connected to each other through the four-way valve 102, and the pipe P09 and the pipe P10 are connected to each other through the four-way valve 102 as well. Accordingly, a part of the refrigerant in the junction J4 flows into the first compressor 111 through the pipes P10 and P09, flows out of the first compressor 111, and then flows to the pipe P06. The rest of the refrigerant in the junction J4 flows into the second compressor 112 through the pipe P07, flows out of the second compressor 112, and then flows to the pipe P11. Thus, in the fourth state shown in FIG. 5, a fourth path that connects the first compressor 111 and the second compressor 112 in parallel is set.

Figure 5:
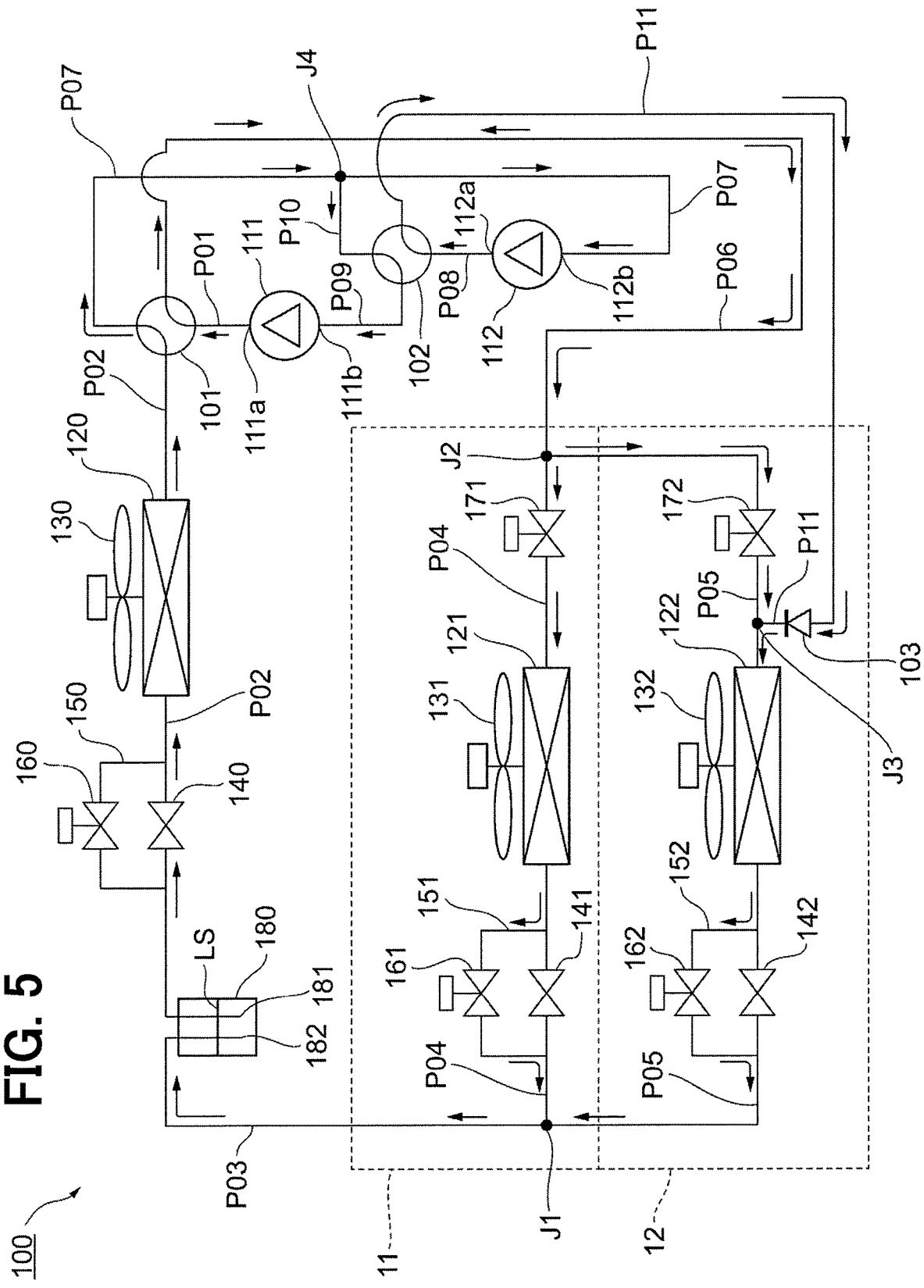
FIG. 5 is a schematic diagram showing the transport refrigeration system as a whole and flows of refrigerant circulating therein in the embodiment.

In the fourth state shown in FIG. 5, the switching valves 161, 162, 171, 172 are open, and the switching valve 160 is closed.

A path that allows the refrigerant, discharged from the first compressor 111, to flow therethrough will be described hereafter. The refrigerant flows into the pipe P06 through the pipe P01 and the four-way valve 101, and then flows into the junction J2. A part of the refrigerant flowing into the junction J2 flows into the pipe P04, flows through the first interior heat exchanger 121 and the pipe 151 in this order, and then flows into the junction J1. The rest of the refrigerant flowing into the junction J2 flows into the pipe P05, flows through the second interior heat exchanger 122 and the pipe 152 in this order, and then flows into the junction J1. The mixed refrigerant mixed in the junction J1 flows into the throttle mechanism 140 via the liquid reservoir 180. A pressure of the mixed refrigerant falls while the mixed refrigerant flows through the throttle mechanism 140, therefore the mixed refrigerant becomes a low-pressure refrigerant. The low-pressure refrigerant passes through the exterior heat exchanger 120. Subsequently, the low-pressure refrigerant flows through the four-way valve 101 and the pipe P07, and then flows into the junction J4. Subsequently, as described above, the part of the refrigerant flowing into the junction J4 flows to the first compressor 111, and the rest of the refrigerant flowing into the junction J4 flows to the second compressor 112.

A path that allows the refrigerant, discharged from the second compressor 112, to flow therethrough will be described hereafter. The refrigerant flows into the pipe P11 through the pipe P08 and the four-way valve 102, and then flows into the pipe P05 through the check valve 103. Then, the refrigerant is mixed with the refrigerant from the junction J2 and flows into the junction J1 through the second interior heat exchanger 122 as described above.

Here, a pressure of the refrigerant in the junction J3 is lower than a pressure of the refrigerant in the pipe P08 when the refrigerant circulates through the fourth path as described above. Accordingly, the check valve 103 does not block a flow of the refrigerant in the pipe P11.

Since the refrigerant flows through the fourth path as described above, the exterior heat exchanger 120 serves as an evaporator in the fourth path, i.e., in the fourth state shown in FIG. 5. The first interior heat exchanger 121 and the second interior heat exchanger 122 each serve as a condenser in the fourth path, i.e., in the fourth state shown in FIG. 5. Accordingly, the exterior heat exchanger 120 recovers heat from the outside air, and a part of the heat transfers to the first interior heat exchanger 121 by the refrigerant and then is dissipated into the first chamber 11. The rest of the heat recovered from the outside air is transferred to the second interior heat exchanger 122 by the refrigerant, and then is dissipated into the second chamber 12. That is, the air both in the first chamber 11 and the second chamber 12 are heated, i.e., the heating operation is performed.

As described above, the transport refrigeration system 100 is configured to be operated in the first, second, third, and fourth states. The controller 201 controls the switching to the first, second, third, and fourth states. FIG. 6 shows operation efficiencies and operating abilities in the first, second, third, and fourth states.

As shown in FIG. 6, the operation efficiencies in the first and second states are greater than the operation efficiencies in the third and fourth states for the following reasons. In the first and second states, the two compressors (i.e., the first compressor 111 and the second compressor 112) are connected to each other in series. Compression ratios of the two compressors connected to each other in series are smaller than compression ratios of the two compressors connected to each other in parallel. As a result, the operation efficiencies of the two compressors connected in series are greater than the operation efficiencies of the two compressors connected in parallel.

The operation ability in the fourth state is greater than the operation abilities in other states for the following reasons. The operation ability may mean, for example, heat dissipating performance. In the fourth state, the two compressors (i.e., the first compressor 111 and the second compressor 112) are connected to each other in parallel. A flow rate of the refrigerant flowing through the transport refrigeration system 100 when the two compressors are connected to each other in parallel is larger than a flow rate of the refrigerant flowing through the transport refrigeration system 100 when the two compressors are connected to each other in series.

Therefore, when both of the first interior heat exchanger 121 and the second interior heat exchanger 122 serve as the condensers and dissipate heat, the first state, which is performed with intermediate heat dissipating performance, or the fourth state, which is performed with high heat dissipating performance, can be set selectively depending on the required heat dissipating performance. That is, an appropriate operation can be performed in accordance with various situations. The operation performances can be switched easily and appropriately only by switching the path that allows the refrigerant to flow therethrough. In other words, the rotational speeds of the first compressor 111 and the second compressor 112 are not changed necessarily to switch to the operation performances.

A control performed by the controller 210 to switch to the first, second, third, or fourth state will be described hereafter referring to FIG. 7. The controller 210 is configured to perform the control such that the temperature in the first chamber 11 becomes a set temperature TS1 and that the temperature in the second chamber 12 becomes a set temperature TS2. The set temperature TS1 corresponds to the first temperature in the present disclosure. The set temperature TS2 corresponds to the second temperature in the present disclosure. The set temperatures TS1 and TS2 are set by a user in advance.

First, a control performed to adjust the temperature in the first chamber 11 when starting an operation of the transport refrigeration system 100 will be described. The horizontal axis of the chart shown in FIG. 7 shows the temperature in the first chamber 11 detected by the temperature detector 191. The vertical axis of the chart shown in FIG. 7 shows operation states of the first interior heat exchanger 121. A state ST01 shown in the chart shows a state where the first interior heat exchanger 121 absorbs heat. That is, in the state ST01, the transport refrigeration system 100 operates in the first state shown in FIG. 2 or the third state shown in FIG. 4. A state ST02 shown in the chart shows a state where the first interior heat exchanger 121 dissipates heat. That is, in the state ST02, the transport refrigeration system 100 operates in the second state shown in FIG. 3 or the fourth state shown in FIG. 5.

Figure 7:
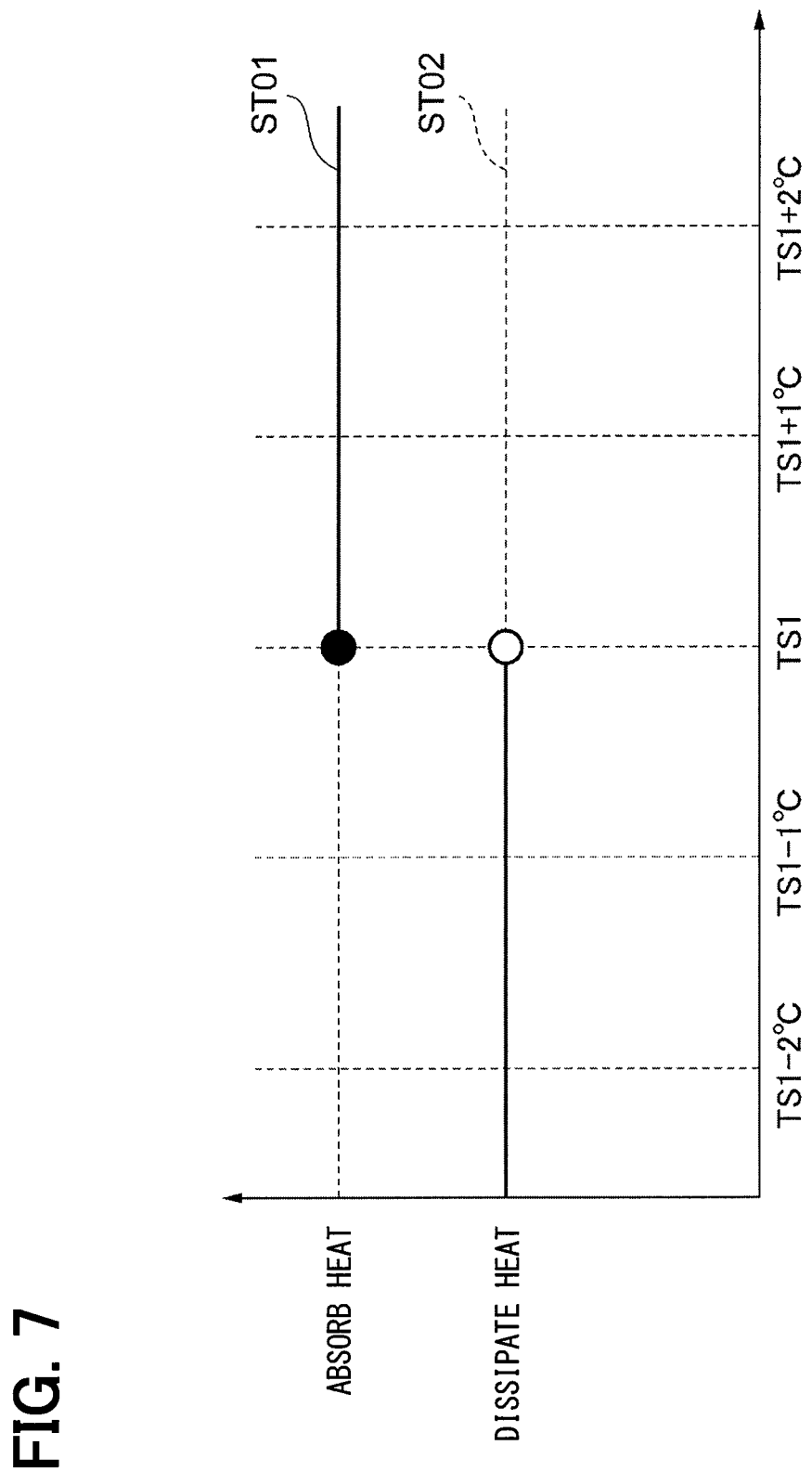
FIG. 7 is a diagram showing an outline of a control performed by a controller.

As shown by a solid line in FIG. 7, the first interior heat exchanger 121 absorbs heat when the temperature in the first chamber 11 is the set temperature TS1 or higher when starting the operation of the transport refrigeration system 100. The first interior heat exchanger 121 dissipates heat in other situations. Accordingly, the air in the first chamber 11 is heated or cooled such that the temperature in the first chamber 11 approaches the set temperature TS1.

Figure 8:
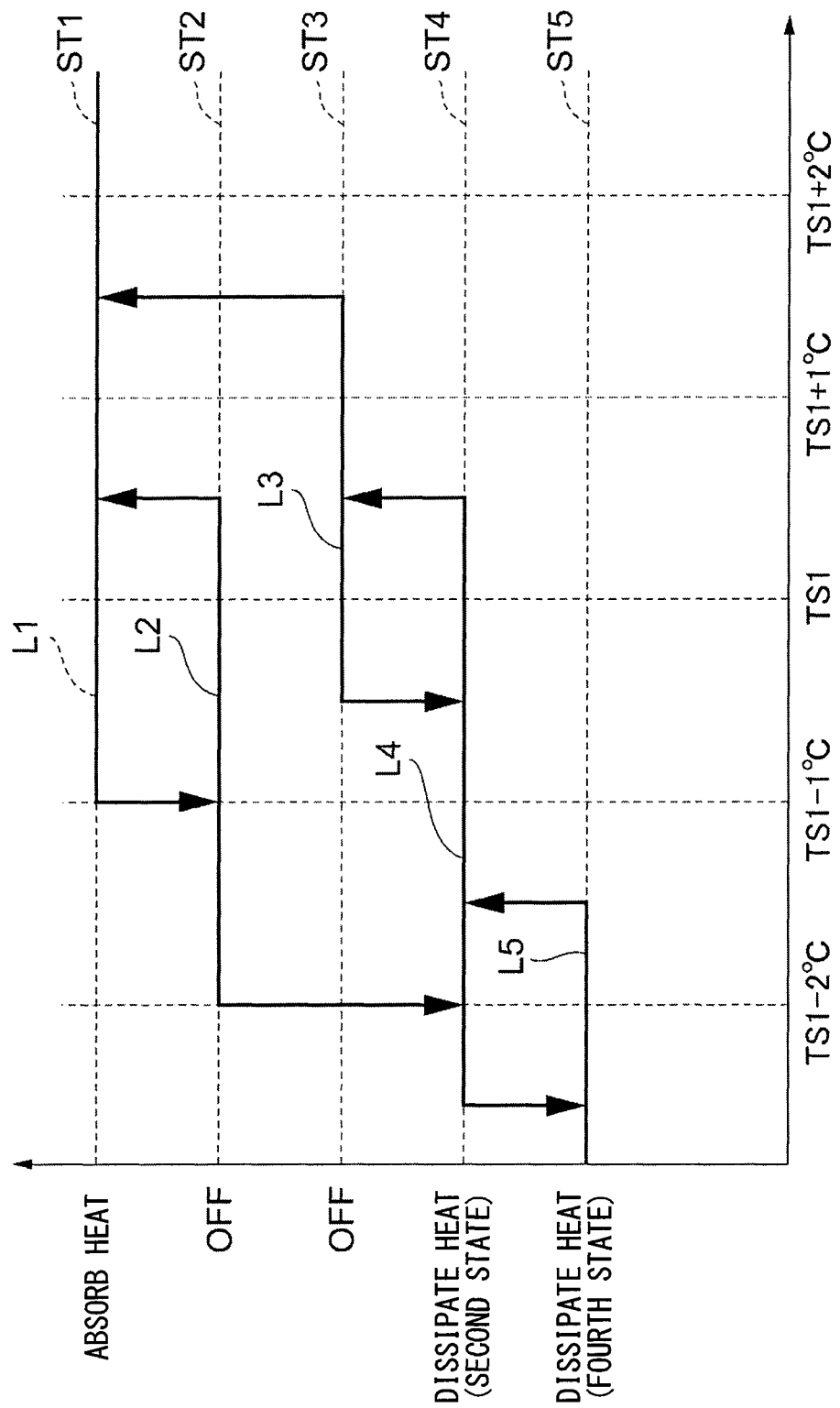
FIG. 8 is a diagram showing an outline of a control performed by a controller.

The above-described control is performed after starting the operation of the transport refrigeration system 100 as well. However, while the transport refrigeration system 100 is being operated, the control is performed considering hysteresis such that the operation states are not switched frequently when the temperature in the first chamber 11 is close to the set temperature TS1. FIG. 8 shows an example of such control.

The horizontal axis of the chart shown in FIG. 8 shows the temperature in the first chamber 11 detected by the temperature detector 191. The vertical axis of the chart shown in FIG. 8 shows operation states of the first interior heat exchanger 121. A state ST1 shown in the uppermost stage of the chart shows a state where the first interior heat exchanger 121 absorbs heat. That is, in the state ST1, the transport refrigeration system 100 operates in the first state shown in FIG. 2 or the third state shown in FIG. 4.

A state ST2 shown in the second stage from the uppermost stage in the chart shows a state where the air conditioning in the first chamber 11 is stopped. A state ST2 shown in the third stage from the uppermost stage in the chart shows the state where the air conditioning in the first chamber 11 is stopped. That is, the air conditioning in the first chamber 11 is stopped both in the state ST2 and the state ST3. In the state ST2, the air conditioning is stopped after the first interior heat exchanger 121 absorbs heat in the state ST2. In the state ST3, the air conditioning is stopped after the first interior heat exchanger 121 dissipates heat.

A state ST4 shown in the fourth stage from the uppermost stage in the chart shows a state where the first interior heat exchanger 121 dissipates heat. That is, in the state ST4, the transport refrigeration system 100 operates in the second state shown in FIG. 3. A state ST5 shown in the lowermost stage in the chart shows a state where the first interior heat exchanger 121 dissipates heat. That is, in the state ST5, the transport refrigeration system 100 operates in the fourth state shown in FIG. 5.

As shown by line L1, the state ST1 is not switched to the state ST2, i.e., the heat absorbing performance is not stopped, immediately after the temperature in the first chamber 11 falls and becomes the set temperature TS1. The state ST1 is switched to the state ST2 when the temperature in the first chamber 11 becomes a temperature lower than the set temperature TS1. The temperature may be 1 degree Celsius lower than the set temperature TS1 (i.e., the temperature is TS1−1° C.).

As shown by line L2, the state ST2 is not switched to the state ST1, i.e., the heat absorbing performance is not started, immediately after the temperature in the first chamber 11 rises and becomes the set temperature TS1. The state ST2 is switched to the state ST1 when the temperature in the first chamber 11 becomes a temperature higher than the set temperature TS1. The temperature may be 0.5 degree Celsius higher than the set temperature TS1 (i.e., the temperature is TS1+0.5° C.).

As shown by line L2, the state ST2 is switched to the state ST4 when the temperature in the first chamber 11 falls and becomes 2 degree Celsius lower than the set temperature TS1, i.e., when the temperature in the first chamber 11 becomes TS1−2° C. In the state ST4, the first interior heat exchanger 121 dissipates heat, and therefore the temperature in the first chamber 11 rises.

As shown by line L4, the state ST4 is switched to the state ST5 when the temperature in the first chamber 11 falls and becomes 2.5 degree Celsius lower than the set temperature TS1, i.e., when the temperature in the first chamber 11 becomes TS1−2.5° C. The transport refrigeration system 100 is operated in the fourth state when the state ST5 is set, the first interior heat exchanger 121 dissipates heat with high heat dissipating performance. As a result, the temperature in the first chamber 11 rises.

As shown by line L5, the state ST5 is switched to the state ST4 when the temperature in the first chamber 11 rises and becomes 1.5 degree Celsius lower than the set temperature TS1, i.e., when the temperature in the first chamber 11 becomes TS1−1.5° C. Accordingly, the first interior heat exchanger 121 dissipates heat with low heat dissipating performance. As a result, the temperature in the first chamber 11 gradually rises.

As shown by line L4, the state ST4 is not switched to the state ST3, i.e., the heat dissipating performance is not stopped, immediately after the temperature in the first chamber 11 rises and becomes the set temperature TS1. The state ST4 is switched to the state ST3 when the temperature in the first chamber 11 becomes a temperature higher than the set temperature TS1. The temperature may be 0.5 degree Celsius higher than the set temperature TS1 (i.e., the temperature is TS1+0.5° C.).

As shown by line L3, the state ST3 is not switched to the state ST4, i.e., the heat dissipating performance is not stopped, immediately after the temperature in the first chamber 11 falls and becomes the set temperature TS1. The state ST3 is switched to the state ST4 when the temperature in the first chamber 11 becomes a temperature lower than the set temperature TS1. The temperature may be 0.5 degree Celsius lower than the set temperature TS1 (i.e., the temperature is TS1−0.5° C.).

As shown by line L3, the state ST3 is switched to the state ST1 when the temperature in the first chamber 11 rises and becomes 1.5 degree Celsius higher than the set temperature TS1, i.e., when the temperature in the first chamber 11 becomes TS1+1.5° C. Accordingly, the first interior heat exchanger 121 absorbs heat, and therefore the temperature in the first chamber 11 falls.

The above-described control for the air conditioning in the first chamber 11 may be employed for the air conditioning in the second chamber 11.

Figure 9:
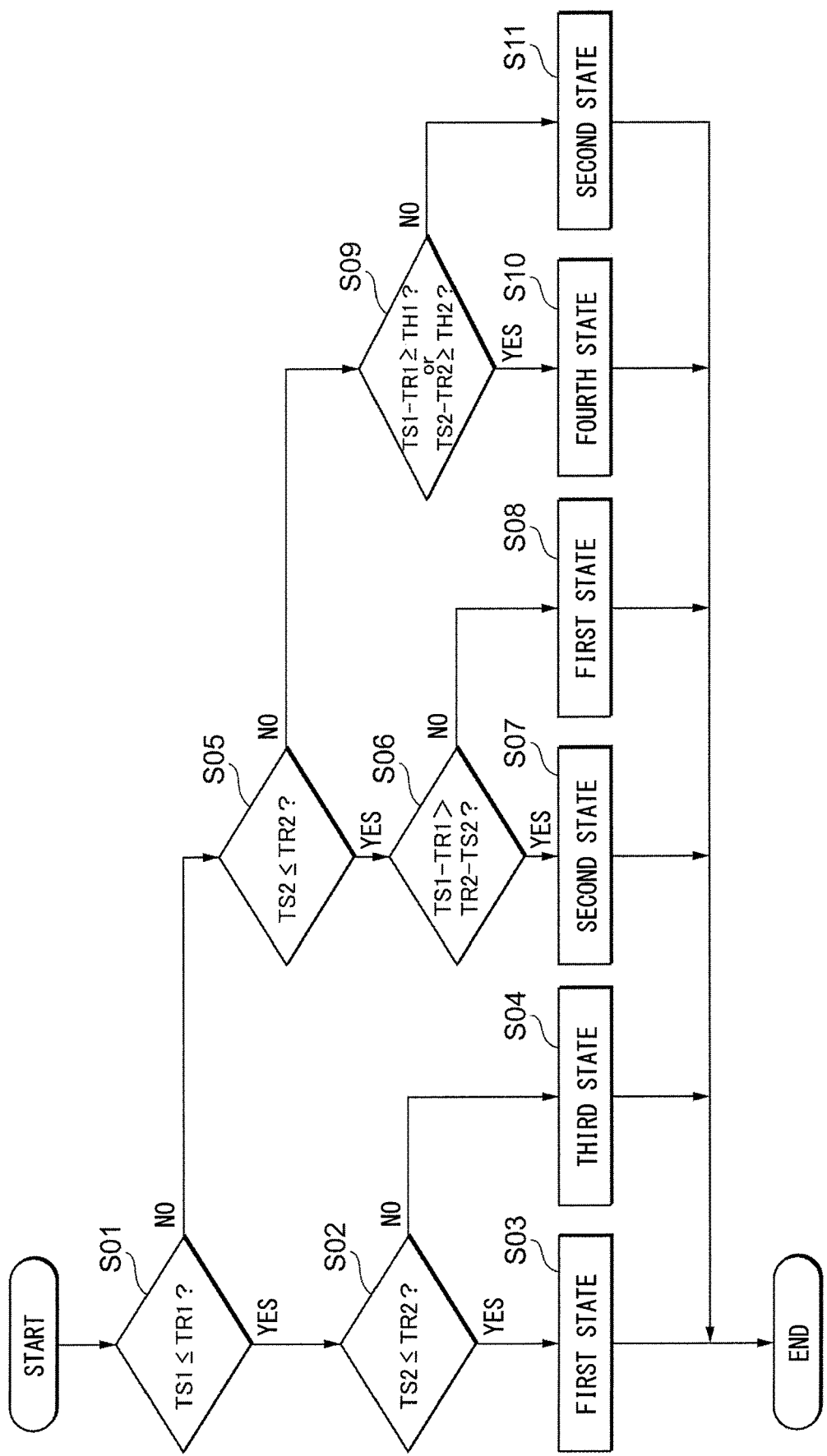
FIG. 9 is a flowchart showing a process performed by the controller.

In the present embodiment, the controller 210 operates the control flow shown in FIG. 9 such that the air conditionings for the first chamber 11 and the second chamber 12 are performed at the same time appropriately. The controller 210 operates the control flow shown in FIG. 9 repeatedly at specified intervals.

At step S01, the controller 210 determines whether the temperature in the first chamber 11 detected by the temperature detector 191 is the set temperature TS1 or higher. The temperature in the first chamber 11 will be referred to as temperature TR1 hereafter. When the temperature TR1 is the set temperature TS1 or higher, the control flow advances to step S02.

At step S02, the controller 210 determines whether the temperature in the second chamber 12 detected by the temperature detector 192 is the set temperature TS2 or higher. The temperature in the second chamber 12 will be referred to as temperature TR2 hereafter. When the temperature TR2 is the set temperature TS2 or higher, the control flow advances to step S03. At step S03, the first state in which the refrigerant is allowed to flow through the first path is set. Accordingly, both the first interior heat exchanger 121 and the second interior heat exchanger 122 absorb heat.

Thus, the controller 210 operates a control process to set the first state when the temperature TR1 in the first chamber 11 is the set temperature TS1 or higher and the temperature TR2 in the second chamber 12 is the set temperature TS2 or higher. As a result, the temperatures in the first chamber 11 and the second chamber 12 can be kept to appropriate temperatures.

The control flow advances from step S02 to step S04 when the temperature TR2 is lower than the set temperature TS2. At step S04, the third state in which the refrigerant is allowed to flow through the third path is set. Accordingly, the first interior heat exchanger 121 absorbs heat, and the second interior heat exchanger 122 radiates heat.

Thus, the controller 210 operates a control process to set the third state when the temperature TR1 in the first chamber 11 is the set temperature TS1 or higher and the temperature TR2 in the second chamber 12 is lower than the set temperature TS2. As a result, the temperatures in the first chamber 11 and the second chamber 12 can be kept to appropriate temperatures.

When the temperature TR1 is lower than the set temperature TS1, the control flow advances from step S01 to step S05. At step S05, the controller 210 determines whether the temperature TR2 is the set temperature TS2 or higher. When the temperature TR2 is the set temperature TS2 or higher, the control flow advances to step S06.

When the controls flow advances to step S06, it means that the heat is required to be dissipated into the first chamber 11 and that the heat is required to be absorbed in the second chamber 12.

As shown in FIG. 1, the first interior heat exchanger 121 is positioned close to the mechanical section 200, and the second interior heat exchanger 122 is positioned away from the mechanical section 200. Accordingly, the refrigeration performance of the first interior heat exchanger 121 is higher than the refrigeration performance of the second interior heat exchanger 122. Considering that cooling performances in the first chamber 11 and the second chamber 12 are started at the same time from the same initial temperature, the control flow does not advances to step S06 since the heat dissipating performance may not be required only for the first chamber 11. Therefore, an operation mode, in which heat is dissipated into the first chamber 11 while the heat is absorbed from the second chamber 12, is not performed in the present embodiment (see FIG. 6).

However, when the control becomes unstable due to some cause, the temperature in the first chamber 11 undershoots greatly and the temperature in the second chamber 12 overshoots greatly, the control flow may advance to step S06. When the control flow advances to step S06 in such situation, the following process is performed.

At step S06, the controller 210 determines whether a difference between the set temperature TS1 and the temperature TR1 is greater than a difference between the set temperature TS2 and the temperature TR2. The control flow advances to step S07 when the difference between the set temperature TS1 and the temperature TR1 is greater than the difference between the set temperature TS2 and the temperature TR2.

When the control flow advances to step S07, it means that a separation degree of the temperature TR1 in the first chamber 11, in which the heat is required to be dissipated, is greater than a separation degree of the temperature TR2 in the second chamber 12, in which the heat is required to be absorbed. Therefore, at step S07, a process to set the second state is performed such that the heat dissipating in the first chamber 11 is performed preferentially. Accordingly, the first interior heat exchanger 121 dissipates heat. In this situation, the controller 210 may close the switching valve 172 such that the second interior heat exchanger 122 does not dissipate heat.

The control flow advances to step S08 when the difference between the set temperature TS1 and the temperature TR1 is smaller than or equal to the difference between the set temperature TS2 and the temperature TR2. When the control flow advances to step S08, it means that the separation degree of the temperature TR2 in the second chamber 12, in which the heat is required to be absorbed, is greater than the separation degree of the temperature TR1 in the first chamber 11, in which the heat is required to be dissipated. Therefore, at step S08, a process to set the first state is performed such that the heat absorbing in the second chamber 12 is performed preferentially. Accordingly, the second interior heat exchanger 122 absorbs heat. In this situation, the controller 210 may close the switching valve 171 such that the first interior heat exchanger 121 does not absorb heat.

The control flow advances to step S09 when the temperature TR2 is determined to be lower than the set temperature TS2 at step S05. At step S09, the controller 210 determines whether the difference between the set temperature TS1 and the temperature TR1 is a specified threshold value TH1 or greater and whether the difference between the set temperature TS2 and the temperature TR2 is a specified threshold value TH2 or greater. The control flow advances to step S10 when the difference between the set temperature TS1 and the temperature TR1 is greater than or equal to the specified threshold value TH1 or when the difference between the set temperature TS2 and the temperature TR2 is greater than or equal to the specified threshold value TH2.

When the control flow advances to step S10, it means that the separation degree of the temperature TR1 in the first chamber 11, in which the heat is required to be dissipated, or the separation degree of the temperature TR2 in the second chamber 12, in which the heat is required to be absorbed, is increased. Accordingly, at step S03, the fourth state in which the refrigerant is allowed to flow through the fourth path is set. As a result, both of the first interior heat exchanger 121 and the second interior heat exchanger 122 dissipate heat with high heat dissipating performance, and therefore the temperatures in the first chamber 11 and the second chamber 12 rise promptly. Thus, the temperatures in the first chamber 11 and the second chamber 12 can become appropriate temperatures promptly.

The control flow advances from step S09 to step S11 when the difference between the set temperature TS1 and the temperature TR1 is not greater than or equal to the specified threshold value TH1 or when the difference between the set temperature TS2 and the temperature TR2 is not greater than or equal to the specified threshold value TH2. When the control flow advances to step S11, it means that both of the separation degree of the temperature TR1 in the first chamber 11, in which the heat is required to be dissipated, and the separation degree of the temperature TR2 in the second chamber 12, in which the heat is required to be dissipated, are relatively small. Accordingly, at step S11, the second state in which the refrigerant is allowed to flow through the second path is set. As a result, both of the first interior heat exchanger 121 and the second interior heat exchanger 122 dissipate heat with low heat dissipating performance, and therefore the temperatures in the first chamber 11 and the second chamber 12 rise gradually. Thus, the temperatures in the first chamber 11 and the second chamber 12 can be set to appropriate temperatures with low power consumption. In addition, the temperature adjustment can be performed stably.

As described above, the controller 210 operates a control process to set the second state or the fourth state when the temperature TR1 in the first chamber 11 is lower than the set temperature TS1 and the temperature TR2 in the second chamber 12 is lower than the set temperature TS2. Specifically, the controller 210 sets the fourth state when the difference between the temperature TR1 in the first chamber 11 and the set temperature TS1 is greater than or equal to the threshold value TH1 or when the difference between the temperature TR2 in the second chamber 12 and the set temperature TS2 is greater than or equal to the threshold value TH2. The controller 210 sets the second state in other situations. The threshold value TH1 corresponds to a first threshold value in the present disclosure. The threshold value TH2 corresponds to a second threshold value in the present disclosure. The threshold value TH1 and the threshold value TH2 may be the same value or may be different values.

The second state may be set in accordance with the necessity of defrosting in the first interior heat exchanger 121 and the second interior heat exchanger 122.

For example, the third state may be set such that the second interior heat exchanger 122 dissipates heat when it is determined that the second interior heat exchanger 122 is required to be defrosted during the first state.

On the other hand, only the first interior heat exchanger 121 may dissipate heat when it is determined that the first interior heat exchanger 121 is required to be defrosted during the first state. However, such operation mode is not performed in the present embodiment (see FIG. 6). Therefore, the operation state is switched to the first state or the second state first, and then the switching valve 172 is closed. When the size of the first interior heat exchanger 121 is large and an amount of the frost formed in the first interior heat exchanger 121 is large, the fourth state causing high heat dissipating performance may be set rather than the second state.

In the present embodiment, the throttle mechanism 140, which is configured to reduce the flow rate of the refrigerant flowing therethrough, is mounted to the passage that connects the outlet of the exterior heat exchanger 120 to the inlet of the first interior heat exchanger 121 in the first path (see FIG. 2). In addition, the pipe 150, which allows the refrigerant to flow therethrough while bypassing the throttle mechanism 140, and the switching valve 160, which opens and closes the pipe 150, are mounted.

By operating the switching valve 160, the controller 210 can switch between an operation state in which the throttle mechanism 140 serves as an expansion valve in the refrigeration cycle and an operation state in which the refrigerant bypasses the throttle mechanism 140. Therefore, the controller 210 can easily change paths, which allows the refrigerant to flow therethrough, and functions of the plurality of heat exchangers such as the exterior heat exchanger 120, the first interior heat exchanger 121, and the second interior heat exchanger 122.

In the present embodiment, the throttle mechanism 141, which is configured to reduce the flow rate of the refrigerant flowing therethrough, is mounted to the passage that connects the outlet of the exterior heat exchanger 120 to the inlet of the interior heat exchanger 121 in the first path (see FIG. 2). The throttle mechanism 141 is located downstream of the throttle mechanism 140. In addition, the pipe 151, which allows the refrigerant to flow therethrough while bypassing the throttle mechanism 141, and the switching valve 161, which opens and closes the pipe 151, are mounted.

In the present embodiment, the throttle mechanism 142, which is configured to reduce the flow rate of the refrigerant flowing therethrough, is mounted to the passage that connects the outlet of the exterior heat exchanger 120 to the inlet of the second interior heat exchanger 122 in the first path (see FIG. 2). The throttle mechanism 142 is located downstream of the throttle mechanism 140. In addition, the pipe 152, which allows the refrigerant to flow therethrough while bypassing the throttle mechanism 142, and the switching valve 162, which opens and closes the pipe 152, are mounted.

That is, a group of the throttle mechanism (141, 142), the pipe (151, 152) serving as a bypass passage, and the switching valve (161, 162) opening and closing the bypass passage is provided for each of the first interior heat exchanger 121 and the second interior heat exchanger 122. Therefore, the controller 210 can more easily change paths, which allows the refrigerant to flow therethrough, and functions of the plurality of heat exchangers such as the exterior heat exchanger 120, the first interior heat exchanger 121, and the second interior heat exchanger 122.

In the third state shown in FIG. 4 of the present embodiment, the refrigerant flowing out of the first compressor 111 flows through the exterior heat exchanger 120, the pipe 150, the throttle mechanism 141 provided for the first interior heat exchanger 121, and the first interior heat exchanger 121 in this order. In the third state, the refrigerant flowing out of the second compressor 112 flows through the second interior heat exchanger 122, the pipe 152 provided for the second interior heat exchanger 122, the throttle mechanism 141 provided for the first interior heat exchanger 121, and the first interior heat exchanger 121 in this order. Accordingly, in the third state, the first interior heat exchanger 121 serves as the evaporator, and the second interior heat exchanger 122 serves as the condenser. That is, air conditionings in the first chamber 11 and the second chamber 12 can be performed in different modes independently.

In the present embodiment, the check valve 103 is mounted to the passage that connects the outlet of the second compressor 112 to the inlet of the second interior heat exchanger 122 in the third path (see FIG. 4). The check valve 103 prevents the refrigerant from flowing from the second interior heat exchanger 122 toward the second compressor 112 in the second path (see FIG. 3). An electromagnetic valve may be mounted instead of the check valve 103, and a switching control may be performed to open and close the electromagnetic valve. However, a flow of the refrigerant can be adjusted, i.e., a cause of a backflow can be suppressed, with a simpler configuration by using the check valve that is mechanically operated depending on a pressure difference of the refrigerant.

In the present embodiment, the switching valve 172 is mounted to the passage that connects the outlets of the first and second compressors 111 and 112 to the inlet of the second interior heat exchanger 121 in the second path (see FIG. 3). In the third state (see FIG. 4), the switching valve 172 is closed. Therefore, the refrigerant flowing out of the second compressor 112 is supplied to a part (i.e., the junction J3) of the passage connecting the switching valve 172 and the second interior heat exchanger 122.

In the third state (see FIG. 4), the refrigerant flows through the path that connects the first interior heat exchanger 121 and the second interior heat exchanger 122 in series. As shown in FIG. 4, the path can be set easily by the switching valve 172.

In the present embodiment, the liquid reservoir 180 is mounted to the passage connecting the throttle mechanism 140 to the throttle mechanisms 141 and 142. The liquid reservoir 180 stores a part of the refrigerant flowing through the transport refrigeration system 100 in the liquid state. The liquid reservoir 180 is configured to discharge only the liquid refrigerant both when discharging the stored refrigerant toward the exterior heat exchanger 120 in the second state shown in FIG. 3 and when discharging the stored refrigerant toward the throttle mechanisms 141 and 142 in the first state shown in FIG. 2. Specifically, both of the other end 181 of the pipe P02 and the other end 182 of the pipe P03 are positioned inside the liquid reservoir 180 below the liquid level LS of the liquid refrigerant stored in the liquid reservoir 180. Therefore, the gas refrigerant is prevented from being discharged from the liquid reservoir 180 toward any devices serving as an expansion valve regardless of a flow direction of the refrigerant circulating through the transport refrigeration system 100.

In the present embodiment, a couple of the compressors are mounted to circulate the refrigerant. The quantity of the compressors may be three. Regardless of the quantity of the compressors, the refrigerant is allowed to flow through paths in which all compressors are connected in series in the first and second states. In addition, regardless of the quantity of the compressors, the refrigerant is allowed to flow through paths in which all compressors are connected in parallel with each other in the third and fourth states.

In the present embodiment, the pipe 150 serving as the bypass passage and the switching valve 160 are provided for the throttle mechanism 140 serving as the expansion valve. Instead of such configuration, an electric expansion valve, which is configured to be fully opened, may replace the throttle mechanism 140. In other words, the throttle mechanism 140 may include portions serving as the pipe 150 and the switching valve 160 therein to be integrated with each other. The throttle mechanisms 141 and 142 and a throttle mechanism 142A described later may have the same configuration.

In the present embodiment, the container of the transportation vehicle 10 is divided into two chambers, i.e., the first chamber 11 and the second chamber 12, and the quantity of the plurality of interior heat exchangers, i.e., the first interior heat exchanger 121 and the second interior heat exchanger 122, corresponds to the quantity of the chambers. However, the quantity of the interior heat exchangers may be three. Such modification example is shown as a transport refrigeration system 100A in FIG. 10.

Figure 10:
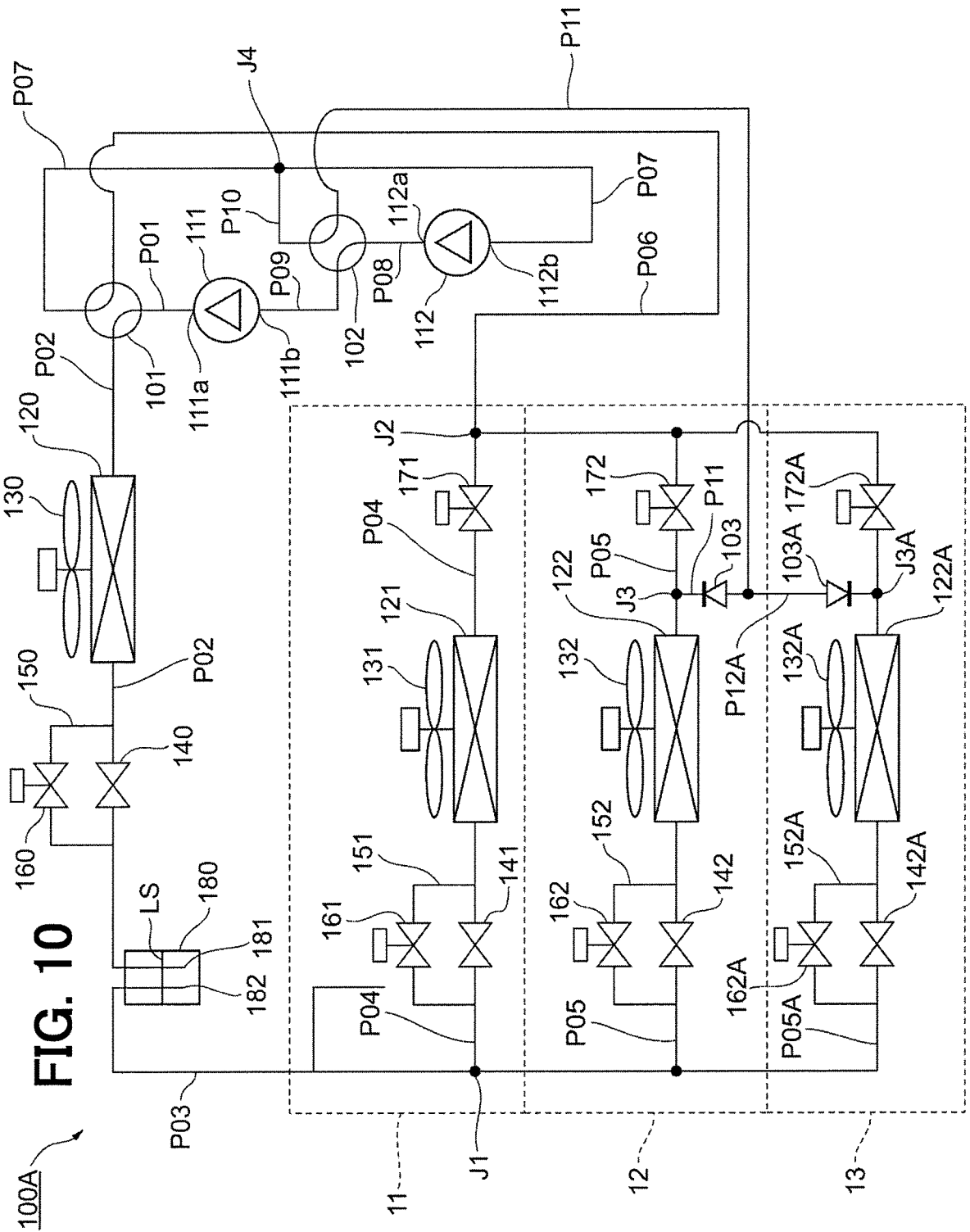
FIG. 10 is a schematic diagram showing a transport refrigeration system as a whole in another embodiment.

In the modification example shown in FIG. 10, the container of the transportation vehicle 10 is divided into three chambers, i.e., the first chamber 11, the second chamber 12, and a third chamber 13. The transport refrigeration system 100A includes a third interior heat exchanger 122A for the third chamber 13. A blower 132A is mounted near the third interior heat exchanger 122A to supply air to the third interior heat exchanger 122A.

The third interior heat exchanger 122A is mounted to a pipe P05A. The pipe P05A is in parallel with the pipe P05. The pipe P05A mounts a switching valve 172A. The switching valve 172A is located between the third interior heat exchanger 122A and the junction J2. In FIG. 10, the switching valve is illustrated on a right side of the third interior heat exchanger 122A. The switching valve 172A is an electromagnetic valve that is configured to be open and closed when receiving a control signal from the controller 210. When the switching valve 172A is closed, the refrigerant is prevented from flowing through the switching valve 172A in the pipe P05A. The third interior heat exchanger 122A is included in the plurality of interior heat exchangers in the present disclosure.

One end of a pipe P12A is connected to the pipe P05A between the switching valve 172A and the third interior heat exchanger 122A. In FIG. 10, a portion where the pipe P05A and the pipe P12A is shown as a junction J3A. The other end of the pipe P12A is connected to the pipe P11 between the check valve 103 and the four-way valve 102. The pipe P12A mounts a check valve 103A. The check valve 103A is configured to allow the refrigerant to flow from the four-way valve 102 toward the junction J3A and to prevent the refrigerant from flowing from the junction J3A toward the four-way valve 102.

The pipe P05A mounts the throttle mechanism 142A between the third interior heat exchanger 122A and the junction J1. In FIG. 10, the throttle mechanism 142A is illustrated on a left side of the third interior heat exchanger 122A. The throttle mechanism 142A is configured to reduce a flow rate of the refrigerant flowing therethrough, i.e., serves as an expansion valve. In the present embodiment, the throttle mechanism 142A may be an electric expansion valve. Therefore, an opening degree of the throttle mechanism 142A can be adjusted depending on a temperature of the refrigerant downstream of the throttle mechanism 142A. The throttle mechanism 142A corresponds to the interior throttle mechanism of the present disclosure.

A pipe 152A is connected to the pipe P05A and serves as a bypass passage that allows the refrigerant to flow therethrough while bypassing the throttle mechanism 142A. The pipe 152A mounts a switching valve 162A that is configured to open and close the pipe 152A. The switching valve 162A may be an electromagnetic valve that is configured to be open and closed when receiving a control signal from the controller 210. When the switching valve 162A is open, the refrigerant flowing through the pipe P05A is allowed to flow through the switching valve 162A. Accordingly, a pressure of the refrigerant upstream of the throttle mechanism 142A and a pressure of the refrigerant downstream of the throttle mechanism 142A are substantially the same. On the other hand, when the switching valve 162A is closed, all of the refrigerant flowing through the pipe P05A passes through the throttle mechanism 142A. Accordingly, the pressure of the refrigerant falls while the refrigerant passes through the throttle mechanism 142A. The pipe 152A corresponds to the interior bypass passage of the present disclosure. The switching valve 162A corresponds to the interior switching valve of the present disclosure.

As described above, the configuration of the third interior heat exchanger 122A and a peripheral configuration thereof are substantially the same as the configuration of the second interior heat exchanger 122 and a peripheral configuration thereof. An operation state of the switching valve 172 and an operation state of the switching valve 172A are the same in each of the first, second, third, and fourth states. An operation state of the switching valve 162 and an operation state of the switching valve 162A are the same in each of the first, second, third, and fourth states. According to the above-described modification example, the same effects as the above-described embodiment can be obtained.

The embodiment of the present disclosure is described above with specific examples. However, the present disclosure is not limited to the specific examples. That is, modifications that are made as required by a person having ordinary skill in the art based on the specific examples are included in a range of the present disclosure as long as having the features of the present embodiment. For example, elements mentioned in the specific examples, an arrangement, a material, a condition, a shape, a size, etc. of the elements are not limited to the specific examples, and can be changed as required. Each element included in each of the above-described specific examples can be appropriately changed in combination as long as no technical inconsistency occurs.

What is claimed is:

1. A transport refrigeration system that is mounted to a vehicle including a container divided into a plurality of chambers, the transport refrigeration system comprising:
a plurality of interior heat exchangers, including a first interior heat exchanger and a second interior heat exchanger, that are positioned in the plurality of chambers respectively and are configured to perform heat exchanges between a refrigerant and air in the plurality of chambers;
an exterior heat exchanger that is configured to perform a heat exchange between the refrigerant and an outside air;
a plurality of compressors, including a first compressor and a second compressor, that are configured to discharge the refrigerant and that are configured to allow the refrigerant to circulate between the plurality of interior heat exchangers and the exterior heat exchanger;
a plurality of switching valves that are configured to set paths selectively, the paths allowing the refrigerant, which is discharged from the plurality of compressors, to flow therethrough;
an exterior expansion valve that is configured to reduce a flow rate of the refrigerant flowing therethrough;
an exterior bypass passage that is connectable to the passage and allows the refrigerant to flow therethrough while bypassing the exterior expansion valve;

an exterior switching valve that is configured to open and close the exterior bypass passage;
an interior expansion valve that is configured to reduce a flow rate of the refrigerant flowing therethrough;
an interior bypass passage that is connectable to the passage and allows the refrigerant to flow therethrough while bypassing the interior expansion valve; and
an interior switching valve that is configured to open and close the interior bypass passage, wherein
a group of the interior expansion valve, the interior bypass passage, and the interior switching valve is provided to each of the plurality of interior heat exchangers,
the paths include
a first path that connects the plurality of compressors in series, the first path in which each of the plurality of interior heat exchangers serves as an evaporator,
a second path that connects the plurality of compressors in series, the second path in which each of the plurality of interior heat exchangers serves as a condenser,
a third path that connects the plurality of compressors in parallel, the third path in which at least one of the plurality of interior heat exchangers serve as the evaporator and the rest of the plurality of interior heat exchangers serve as the condenser, and
a fourth path that connects the plurality of compressors in parallel, the fourth path in which the plurality of interior heat exchangers each serve as the condenser,
in the first path,
the exterior expansion valve is positioned in a passage that connects an outlet of the exterior heat exchanger to inlets of the plurality of interior heat exchangers and
the interior expansion valve is positioned in the passage downstream of the exterior expansion valve, and
in the third path,
the refrigerant, which flows out of the first compressor, flows through the exterior heat exchanger, the exterior bypass passage, the interior expansion valve corresponding to the first interior heat exchanger, and the first interior heat exchanger in this order and
the refrigerant, which flows out of the second compressor, flows through the second interior heat exchanger, the interior bypass passage corresponding to the second interior heat exchanger, the interior expansion valve corresponding to the first interior heat exchanger, and the first interior heat exchanger in this order.

2. The transport refrigeration system according to claim 1, the transport refrigeration system further comprising
a switching valve that is mounted to a passage connecting an outlet of the second compressor to an inlet of the second interior heat exchanger in the third path, wherein
the switching valve is configured to prevent the refrigerant, which flows out of the first compressor, from flowing toward the second compressor in the second path.

3. The transport refrigeration system according to claim 1, the transport refrigeration system further comprising
a switching valve that is mounted to a passage, which connects an outlet of the first compressor to an inlet of the second interior heat exchanger in the second path, the passage allowing the refrigerant, flowing through the first and second compressors, to flow therethrough from the outlet of the first compressor to the second interior heat exchanger in the second path, wherein
when the third path is set,
the switching valve is closed and
the refrigerant flowing out of the second compressor flows into a junction in a passage connecting the switching valve and the second interior heat exchanger.

4. The transport refrigeration system according to claim 1, the transport refrigeration system further comprising
a liquid reservoir that stores a part of the refrigerant, which circulates in the transport refrigeration system, in a liquid state, the liquid reservoir being mounted to a passage connecting the exterior expansion valve and the interior expansion valve to each other, wherein
the liquid reservoir discharges only a liquid refrigerant both in a case of discharging the refrigerant stored therein toward the exterior expansion valve and in a case of discharging the refrigerant stored therein toward the interior expansion valve.

5. The transport refrigeration system according to claim 1, the transport refrigeration system further comprising
a controller that is configured to set the first path, the second path, the third path, and the fourth path selectively.

6. The transport refrigeration system according to claim 5, wherein
the plurality of chambers include a first chamber and a second chamber, and
the controller sets the first path when a temperature in the first chamber is higher than a first temperature and a temperature in the second chamber is higher than a second temperature.

7. The transport refrigeration system according to claim 5, wherein
the plurality of chambers include a first chamber and a second chamber, and
the controller sets the third path when a temperature in the first chamber is higher than a first temperature and a temperature in the second chamber is lower than a second temperature.

8. The transport refrigeration system according to claim 5, wherein
the plurality of chambers include a first chamber and a second chamber, and
the controller sets the second or fourth path when a temperature in the first chamber is lower than a first temperature and a temperature in the second chamber is lower than a second temperature.

9. The transport refrigeration system according to claim 8, wherein
the controller sets the fourth path when a temperature difference between the temperature in the first chamber and the first temperature is a first threshold value or greater or when a temperature difference between the temperature in the second chamber and the second temperature is a second threshold value or greater, and
the controller otherwise sets the second path.

* * * * *